(12) United States Patent
Buschmann

(10) Patent No.: US 11,827,543 B2
(45) Date of Patent: *Nov. 28, 2023

(54) METHOD FOR CONTINUOUS SUPPLY OF SUPEROXIDE-CONTAINING PERACETATE OXIDANT SOLUTION

(71) Applicant: Clean Chemistry, Inc., Boulder, CO (US)

(72) Inventor: Wayne E. Buschmann, Boulder, CO (US)

(73) Assignee: Clean Chemistry, Inc., Boulder, CO (US)

( * ) Notice: Subject to any disclaimer, the term of this patent is extended or adjusted under 35 U.S.C. 154(b) by 409 days.

This patent is subject to a terminal disclaimer.

(21) Appl. No.: 17/119,956

(22) Filed: Dec. 11, 2020

(65) Prior Publication Data

US 2021/0206671 A1 Jul. 8, 2021

Related U.S. Application Data

(63) Continuation of application No. 16/363,819, filed on Mar. 25, 2019, now Pat. No. 10,875,798, which is a
(Continued)

(51) Int. Cl.
*C02F 1/28* (2023.01)
*C02F 1/66* (2023.01)
(Continued)

(52) U.S. Cl.
CPC ............... *C02F 1/72* (2013.01); *C02F 1/281* (2013.01); *C02F 1/5227* (2013.01); *C02F 1/56* (2013.01);
(Continued)

(58) Field of Classification Search
CPC .......... C02F 1/72; C02F 1/281; C02F 1/5227; C02F 1/56; C02F 1/66; C02F 1/722;
(Continued)

(56) References Cited

U.S. PATENT DOCUMENTS

| 3,719,552 A | 3/1973 | Farley |
| 3,925,234 A | 12/1975 | Hachmann et al. |

(Continued)

FOREIGN PATENT DOCUMENTS

| CN | 1142555 A | 2/1997 |
| CN | 102007230 A | 4/2011 |

(Continued)

OTHER PUBLICATIONS

Coyle et al.; "Peracetic Acid as an Alternative Disinfection Technology for Wet Weather Flows"; Water Environment Research; Aug. 2014; pp. 687-697.
(Continued)

*Primary Examiner* — Pranav N Patel
(74) *Attorney, Agent, or Firm* — Holzer Patel Drennan

(57) ABSTRACT

A method for continuous supply of peracetate oxidant solution with activity to generate to generate reactive oxygen species includes production processing in a liquid stream starting with a feed water and sequentially adding alkali concentrate, hydrogen peroxide solution and acetyl donor and introducing a resulting peracetate oxidant solution into a product buffer tank from which the peracetate oxidant solution is dispensed for use as a reactive oxygen species-generating oxidant, In the product buffer tank peracetate oxidant solution has a pH in a range of from pH 10 to pH 12, a molar ratio of peracetate anions to peracid in a range of from 60:1 to 6000:1 and a molar ratio of peracetate anions to hydrogen peroxide of greater than 16:1.

20 Claims, 8 Drawing Sheets

Related U.S. Application Data continuation of application No. 14/846,123, filed on Sep. 4, 2015, now Pat. No. 10,259,729.

(60) Provisional application No. 62/046,097, filed on Sep. 4, 2014.

(51) Int. Cl.

| | | |
|---|---|---|
| *C02F 9/00* | (2023.01) | |
| *C02F 1/72* | (2023.01) | |
| *C02F 1/52* | (2023.01) | |
| *C02F 1/56* | (2023.01) | |
| *C02F 5/02* | (2023.01) | |
| C02F 1/24 | (2023.01) | |
| C02F 1/40 | (2023.01) | |
| C02F 1/74 | (2023.01) | |
| C02F 101/20 | (2006.01) | |
| C02F 103/10 | (2006.01) | |
| C02F 103/36 | (2006.01) | |
| C02F 1/00 | (2023.01) | |
| C02F 101/32 | (2006.01) | |

(52) U.S. Cl.
CPC .............. *C02F 1/66* (2013.01); *C02F 1/722* (2013.01); *C02F 5/02* (2013.01); *C02F 9/00* (2013.01); C02F 1/24 (2013.01); C02F 1/28 (2013.01); C02F 1/40 (2013.01); C02F 1/5245 (2013.01); C02F 1/74 (2013.01); C02F 2001/007 (2013.01); C02F 2101/203 (2013.01); C02F 2101/32 (2013.01); C02F 2103/10 (2013.01); C02F 2103/365 (2013.01); C02F 2209/04 (2013.01); C02F 2209/06 (2013.01); C02F 2303/04 (2013.01); C02F 2303/12 (2013.01); C02F 2303/22 (2013.01); C02F 2305/023 (2013.01); C02F 2305/12 (2013.01); Y02W 10/37 (2015.05)

(58) Field of Classification Search
CPC ...... C02F 5/02; C02F 9/00; C02F 1/24; C02F 1/28; C02F 1/40; C02F 1/5245; C02F 1/74; C02F 2001/007; C02F 2101/203; C02F 2101/32; C02F 2103/10; C02F 2103/365; C02F 2209/04; C02F 2209/06; C02F 2303/04; C02F 2303/12; C02F 2303/22; C02F 2305/023; C02F 2305/12; Y02W 10/37

See application file for complete search history.

(56) References Cited

U.S. PATENT DOCUMENTS

| | | |
|---|---|---|
| 4,055,505 A | 10/1977 | Gray |
| 4,076,621 A | 2/1978 | Hardison |
| 4,348,256 A | 9/1982 | Bergstrom, Jr. et al. |
| 4,393,037 A | 7/1983 | Delaney |
| 4,576,609 A | 3/1986 | Hageman |
| 4,673,473 A | 6/1987 | Ang |
| 4,722,773 A | 2/1988 | Plowman et al. |
| 4,872,953 A | 10/1989 | Smith |
| 4,952,276 A | 8/1990 | Gidlund |
| 4,966,706 A | 10/1990 | Gregor |
| 5,053,142 A | 10/1991 | Sorensen et al. |
| 5,246,543 A | 9/1993 | Meier et al. |
| 5,387,317 A | 2/1995 | Parthasarathy et al. |
| 5,424,032 A | 6/1995 | Christensen et al. |
| 5,431,781 A | 7/1995 | Walsh |
| 5,472,619 A | 12/1995 | Holzhauer et al. |
| 5,494,588 A | 2/1996 | LaZonby |
| 5,565,073 A | 10/1996 | Fraser et al. |
| 5,624,575 A | 4/1997 | Meade et al. |
| 5,683,724 A | 11/1997 | Hei et al. |
| 5,770,035 A | 6/1998 | Faita |
| 5,785,812 A | 7/1998 | Linsten et al. |
| 5,817,240 A | 10/1998 | Miller et al. |
| 6,007,678 A | 12/1999 | Linsten et al. |
| 6,015,536 A | 1/2000 | Lokkesmoe et al. |
| 6,126,782 A | 10/2000 | Liden et al. |
| 6,183,623 B1 | 2/2001 | Cisar et al. |
| 6,258,207 B1 | 7/2001 | Pan |
| 6,294,047 B1 | 9/2001 | Chakar et al. |
| 6,387,238 B1 | 5/2002 | Merk et al. |
| 6,569,286 B1 | 5/2003 | Withenshaw et al. |
| 6,712,949 B2 | 3/2004 | Gopal |
| 8,318,972 B2 | 11/2012 | Buschmann et al. |
| 9,517,955 B2 | 12/2016 | Buschmann |
| 9,517,956 B2 | 12/2016 | Buschmann |
| 9,551,076 B2 | 1/2017 | Buschmann |
| 10,259,729 B2 | 4/2019 | Buschmann |
| 10,472,265 B2 | 11/2019 | Buschmann |
| 10,501,346 B2 | 12/2019 | Buschmann |
| 10,577,698 B2 | 3/2020 | Buschmann |
| 10,611,656 B2 | 4/2020 | Buschmann |
| 10,875,798 B2 | 12/2020 | Buschmann |
| 10,875,799 B2 | 12/2020 | Buschmann |
| 10,883,224 B2 | 1/2021 | Buschmann |
| 10,941,063 B2 | 3/2021 | Buschmann |
| 11,001,864 B1 | 5/2021 | Buschmann |
| 11,111,629 B2 | 9/2021 | Buschmann et al. |
| 2001/0050234 A1 | 12/2001 | Shiepe |
| 2002/0153262 A1 | 10/2002 | Uno et al. |
| 2003/0019757 A1 | 1/2003 | Vetrovec |
| 2003/0019758 A1 | 1/2003 | Gopal |
| 2003/0024054 A1 | 2/2003 | Burns |
| 2004/0035803 A1 | 2/2004 | Cronan et al. |
| 2004/0112555 A1 | 6/2004 | Tolan et al. |
| 2004/0134857 A1 | 7/2004 | Huling et al. |
| 2004/0200588 A1 | 10/2004 | Walker |
| 2005/0183949 A1 | 8/2005 | Daly |
| 2006/0207734 A1 | 9/2006 | Day |
| 2007/0074975 A1 | 4/2007 | Buschmann et al. |
| 2007/0212594 A1 | 9/2007 | Takasu et al. |
| 2007/0243449 A1 | 10/2007 | Sotomura et al. |
| 2009/0012346 A1 | 1/2009 | Al Nashef et al. |
| 2009/0090478 A1 | 4/2009 | Hollomon et al. |
| 2009/0152123 A1 | 6/2009 | Butler et al. |
| 2009/0285738 A1 | 11/2009 | Winter et al. |
| 2009/0314652 A1 | 12/2009 | Buschmann |
| 2010/0078331 A1 | 4/2010 | Scherson et al. |
| 2010/0160449 A1 | 6/2010 | Rovison, Jr. et al. |
| 2010/0176066 A1 | 7/2010 | Budde et al. |
| 2010/0179368 A1 | 7/2010 | Conrad |
| 2010/0320156 A1* | 12/2010 | Olaiya ................ C02F 1/30 162/78 |
| 2011/0017066 A1 | 1/2011 | Takeuchi et al. |
| 2011/0024361 A1 | 2/2011 | Schwartzel |
| 2011/0123642 A1 | 5/2011 | Wilmotte |
| 2011/0232853 A1 | 9/2011 | Yin |
| 2012/0067532 A1 | 3/2012 | Lee |
| 2012/0091069 A1 | 4/2012 | Fischmann |
| 2012/0108878 A1 | 5/2012 | Conrad |
| 2012/0145643 A1 | 6/2012 | Pandya |
| 2012/0240647 A1 | 9/2012 | Montemurro |
| 2012/0267315 A1 | 10/2012 | Soane et al. |
| 2012/0322873 A1 | 12/2012 | Atkins et al. |
| 2013/0259743 A1 | 10/2013 | Keasler et al. |
| 2013/0264293 A1 | 10/2013 | Keasler et al. |
| 2014/0069821 A1 | 3/2014 | Marcin et al. |
| 2014/0072653 A1 | 3/2014 | Buschmann |
| 2014/0131217 A1 | 5/2014 | Buschmann |
| 2014/0131259 A1 | 5/2014 | Goldblatt |
| 2014/0197102 A1 | 7/2014 | Van Der Wal et al. |
| 2014/0205777 A1 | 7/2014 | Hawkins et al. |
| 2014/0238626 A1 | 8/2014 | Tsuji et al. |
| 2014/0374104 A1 | 12/2014 | Seth |

FOREIGN PATENT DOCUMENTS

| | | | |
|---|---|---|---|
| EP | 0480469 | A3 | 4/1992 |
| FR | 2776312 | A1 | 9/1999 |

(56) References Cited

FOREIGN PATENT DOCUMENTS

| WO | 9402423 A1 | 2/1994 |
|----|------------|--------|
| WO | 9412721 A1 | 6/1994 |
| WO | 9739179 A1 | 10/1997 |
| WO | 1999032710 A1 | 7/1999 |
| WO | 2000069778 A1 | 11/2000 |
| WO | 2008056025 A2 | 5/2008 |
| WO | 2010059459 A1 | 5/2010 |
| WO | 2012166997 A3 | 12/2012 |
| WO | 2013060700 A1 | 5/2013 |
| WO | 2013064484 A1 | 5/2013 |
| WO | 2014039929 A1 | 3/2014 |
| WO | 2014100828 A1 | 6/2014 |
| WO | 2016037149 A1 | 3/2016 |

OTHER PUBLICATIONS

Gullichsen et al., eds.; Chemical Pulping; Papermaking Science and Technology; Book 6A; 1999; Fapet Oy; pp. A40-A41 and A616-A665.

Hill et al.; "Part 1: Peracetic Acid—An effective alternative for Chlorine compound Free Delignification of Kraft Pulp"; 1992; Pulping Conference; pp. 1219-1230.

Pedros et al.; "Chlorophyll fluorescence emission spectrum inside a leaf"; The Royal Society of Chemistry and Owner Societies; 2008; No. 7; pp. 498-502.

Shackford; "A Comparison of Pulping and Bleaching of Kraft Softwood and Eucalyptus Pulps"; 36th Intl. Pulp and Paper Congress and Exhibition; Oct. 13-16, 2003; Sao Paulo, Brazil; 17 pgs.

Smook, Handbook for Pulp & Paper Technologists, 1992, Chapter 14: Secondary Fiber; Fifth printing 2001, Angus Wilde Publications, Vancouver B.C., pp. 209-219.

Smook, Handbook for Pulp & Paper Technologists, 1992, Chapter 4: Overview of Pulping Methodology and Chapter 7: Kraft Pulping, Fifth printing 2001, Angus Wilde Publications, Vancouver B.C., pp. 36-44 and 74-83.

Suihko et al.; "A study of the microflora of some recycled fibre pulps, boards and kitchen rolls"; The Journal of Applied Microbiology; 1997; vol. 83; pp. 199-207.

Suslow; "Oxidation-Reduction Potential (ORP) for Water Disinfection Monitoring, Control, and Documentation"; Univ. California; Division of Agriculture and Natural Resources; ANR Publication 8149; 5 pgs.; http://anrcatalog.ucdavis.edu; 2004; 5 pgs.

Szabo et al.; "Utilization of NaClO and $H_2O_2$ as a Source of the Singlet Oxygen for the Environmental Bleaching of Pulp"; Cellulose Chem. Technol.; vol. 28; 1994; pp. 183-194.

Verween et al.; "Comparative toxicity of chlorine and peracetic acid in the biofouling control of Mytilopsis leucophaeata and Dreissena polymorpha embryos (*Mollusca, Bivalvia*)"; International Biodeterioration & Biodegradation; vol. 63, No. 4; 2009; pp. 523-528.

Xu et al.; "Isotope and surface preparation effects on alkaline dioxygen reduction at carbon electrodes"; J. Electrochemical Chemistry 410; 1996; pp. 235-242.

Gullichsen et al., eds.; Chemical Pulping; Papermaking Science and Technology, Book 6A; 1999, Fapet Oy, pp. A137-A145.A1.

* cited by examiner

METHOD FOR CONTINUOUS SUPPLY OF SUPEROXIDE-CONTAINING PERACETATE OXIDANT SOLUTION

PRIORITY CLAIM

This application is a continuation of U.S. patent application Ser. No. 16/363,819 entitled "SYSTEMS AND METHOD OF WATER TREATMENT UTILIZING REACTIVE OXYGEN SPECIES AND APPLICATIONS THEREOF" filed on Mar. 25, 2019; which is a continuation of U.S. patent application Ser. No. 14/846,123 (now issued as U.S. Pat. No. 10,259,729) entitled "SYSTEMS AND METHOD OF WATER TREATMENT UTILIZING REACTIVE OXYGEN SPECIES AND APPLICATIONS THEREOF" filed on Sep. 4, 2015, which claims the benefit of U.S. Provisional Patent Application No. 62/046,097 entitled "SYSTEMS AND METHOD FOR GENERATION OF REACTIVE OXYGEN SPECIES AND APPLICATIONS THEREOF" filed on Sep. 4, 2014, all of which are incorporated by reference herein.

BACKGROUND OF THE INVENTION

1. Field of the Invention

The present disclosure generally relates to water treatment, including separation and clarification using peracetate oxidant solutions.

2. Description of the Relevant Art

It is known that a combination of reactive oxygen species can be beneficial to water treatment, cleaning, decontamination and remediation applications as they will combat a variety of substrate types which may be present and react with a variety of oxidation byproducts during their breakdown.

Several common issues arise with the use of conventional reactive oxidant species formulations including, for example, limited shelf life, low mobility of oxidants and/or catalysts; highly acidic or alkaline oxidants which cause significant changes in the natural soil or groundwater pH; limited options for oxidant types available from a single product or system; and logistic, cost, regulatory (e.g., permitting requirements), or safety issues associated with bringing large quantities of strong oxidizers and hazardous chemicals on site. Additionally, the use of conventional iron-based hydrogen peroxide Fenton catalysts and sodium persulfate activators, such as iron (II) sulfate, require an acidic pH of less than 4 to be active, but as the pH increases toward neutral pH, the precipitation of iron oxides and oxyhydroxides occurs.

Precipitated iron can cause pore plugging in soils, fouling and staining of equipment and can promote population blooms of iron bacteria which cause biofouling of soils, and accelerated microbial corrosion of steel well casings, pipes and equipment.

It is desirable to find an efficient and cost effective method of effectively separating contaminants from impaired water.

SUMMARY

In some embodiments, a method provides for enhancing water clarification and/or microbial control, enhancing water pretreatment prior to filtration, desalination, and hydrofracturing, enhancing separation and recovery of oil, subterranean treatment of sour wells and subterranean well treatments, and wellbore treatments for stimulating and/or recovering petroleum or natural gas from a subterranean formation. The methods may include providing a peracetate oxidant solution. The peracetate solution may include peracetate anions and a peracid. In some embodiments, the peracetate solution has a pH from about pH 10 to about pH 12. In some embodiments, the peracetate solution has a molar ratio of peracetate anions to peracid ranging from about 60:1 to about 6000:1. In some embodiments, the peracetate solution has a molar ratio of peracetate to hydrogen peroxide of greater than about 16:1. The peracetate oxidant solution may provide enhanced separation and clarification of impaired water, oil and/or organic phase separation. The peracetate oxidant solution may provide enhanced flocculation, enhanced sludge quality, enhanced performance of anionic flocculation polymers, and synergy with flocculation polymers. The peracetate oxidant solution may allow for accurate ORP monitoring and control of the peracetate solution oxidant dose rate when treating water.

In some embodiments, water phase as used herein generally refers to water which has had at least a majority of hydrocarbons (e.g., oil) and/or at least a majority of solids removed after interaction with reactive oxygen species; however the water may not have at least some solids and/or at least some impurities removed. Water phase may be in contrast to an oil/hydrocarbon phase or solid phase like a separated sludge. In some embodiments, water phase may be defined as less than about 5% to about 10% suspended solids. In some embodiments, water phase may be defined as less than 1% to 5% oil.

In some embodiments, clarified water as used herein generally refers to water which has had at least a majority of hydrocarbons, suspended solids, and impurities removed.

In some embodiments, a method may include removing at least some solids by passing the impaired water through a filter. The method may include removing at least some solids by passing the impaired water through a filter before contacting the impaired water with a peracetate oxidant solution. Separating the impaired water oxidant solution mixture into solids and the water phase may include filtering, gravity settling, flotation, and centrifugation.

In some embodiments, a method may include adding a floc aid to the impaired water to separate the impaired water into solids and the water phase. The water phase may include clarified water. Contacting impaired water with the peracetate oxidant solution may include the addition of a floc aid. The floc aid may be selected from anionic polymers, cationic polymers and adsorbents. In some embodiments, the method may include adding a floc aid after contacting impaired water with the peracetate oxidant solution.

In some embodiments, a method may include contacting the impaired water with a softener. In some embodiments, a method may include adding a softener to the impaired water to separate the impaired water into solids and the water phase. The water phase may include clarified water. The method may include increasing the contacting time between the addition of the softener to promote precipitation of scaling materials.

In some embodiments, a method may include contacting the impaired water with a reactive coagulant. In some embodiments, a method may include adding a reactive coagulant to the impaired water to separate the impaired water into solids and the water phase. The water phase may include clarified water.

In some embodiments, a method may include adding a softener and a floc aid to the impaired water to separate the impaired water into solids and the water phase. In some embodiments, a method may include adding a reactive coagulant and a floc aid to the impaired water to separate the impaired water into solids and the water phase. In some embodiments, a method may include adding a reactive coagulant, a softener, and/or a floc aid to the impaired water to separate the impaired water into solids and the water phase.

In some embodiments, the impaired water may include at least one contaminant, and wherein the at least one contaminant comprises salt, scaling minerals, transition metals, dissolved and suspended inorganic materials, dissolved and suspended organic materials, oils, grease, petroleum hydrocarbons, asphaltenes, aromatic hydrocarbons, hydraulic fracturing fluid chemicals, polysaccharide gels, non-oxidizing biocides, scale inhibitors, iron stabilizers, hydrogen sulfide, naturally occurring radioactive materials, bacteria or other microorganisms.

In some embodiments, contacting impaired water with the peracetate oxidant solution may include reducing a microbial population in the impaired water. In some embodiments, separating the impaired water oxidant solution mixture into solids and the water phase further comprises at least removing some of a microbial population from the impaired water.

In some embodiments, the method may include contacting the water phase with a pH adjuster to balance pH.

In some embodiments, the method may include controlling a peracetate oxidant solution dose rate by monitoring an oxidative reduction potential of the impaired water oxidant solution mixture.

In some embodiments, the water phase may be stored, reused, disposed of or further treated.

BRIEF DESCRIPTION OF THE DRAWINGS

Advantages of the present invention may become apparent to those skilled in the art with the benefit of the following detailed description of the preferred embodiments and upon reference to the accompanying drawings.

Figure 1:
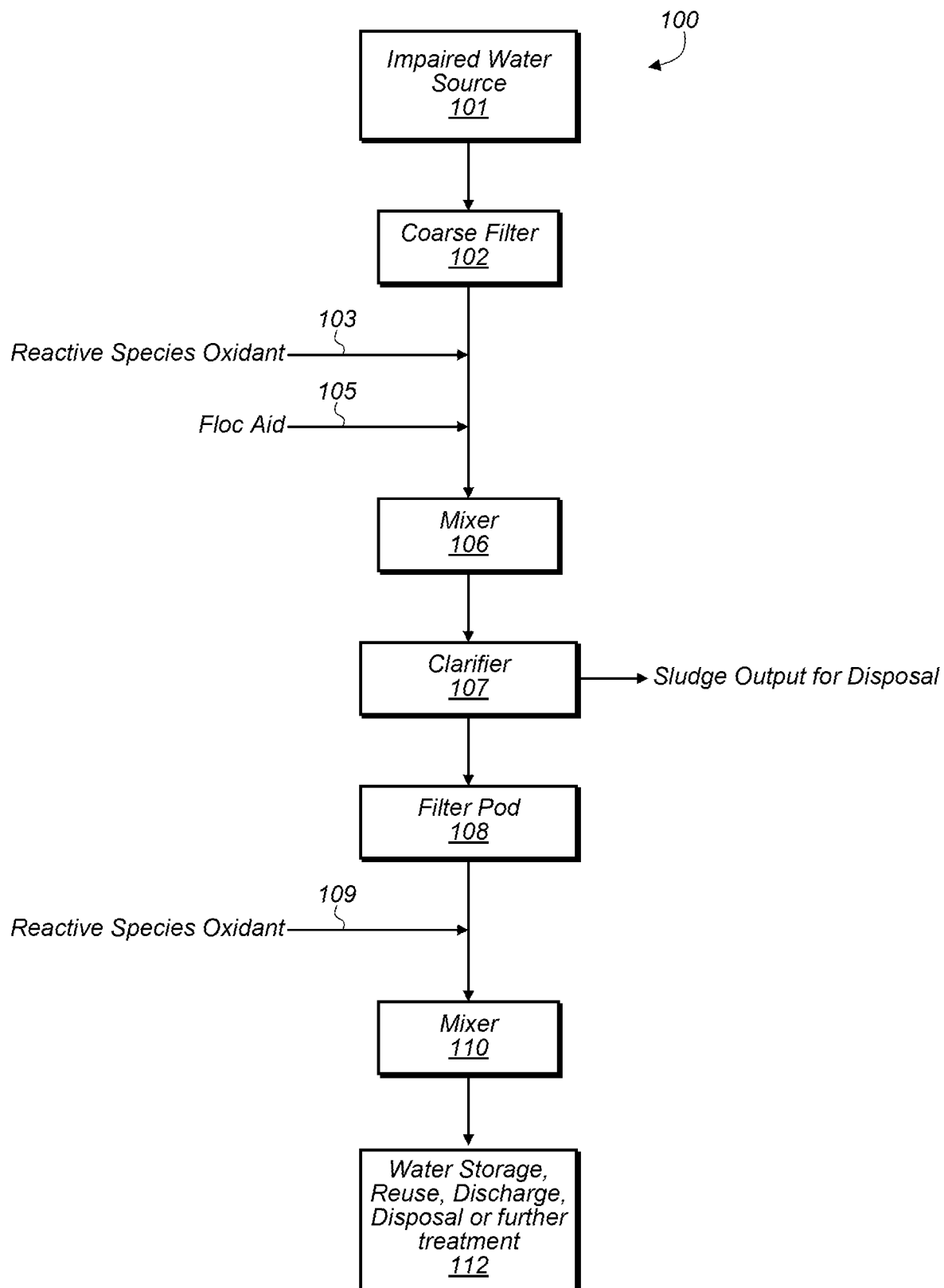
FIG. 1 depicts a schematic representation of a flow chart of the method to separate and clarify impaired water, referred to herein as a Tier 1 process.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that"

performs the task or tasks during operation. As such, the component can be configured to perform the task even when the component is not currently performing that task. In some contexts, "configured to" may be a broad recitation of structure generally meaning "having a feature that" performs the task or tasks during operation. As such, the component can be configured to perform the task even when the component is not currently on.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "impaired water" as used herein generally refers to water containing contaminants including salt, scaling minerals, transition metals, dissolved and suspended inorganic materials, dissolved and suspended organic materials, oils, grease, petroleum hydrocarbons, asphaltenes, aromatic hydrocarbons, hydraulic fracturing fluid chemicals, polysaccharide gels, non-oxidizing biocides, scale inhibitors, iron stabilizers, hydrogen sulfide, naturally occurring radioactive materials (NORM), bacteria and other microorganisms.

The term "reactive oxygen species" as used herein generally refers to a species such as may include singlet oxygen ($^1O_2$), superoxide radical ($O_2^{\cdot-}$), hydroperoxyl radical (HOO·), hydroxyl radical (HO·), acyloxy radical (RC(O)—O·), and other activated or modified forms of ozone (e.g., ozonides and hydrogen trioxide). Each of these ROS has its own oxidation potential, reactivity/compatibility profile, compatibility/selectivity and half-lives.

The term "reactive species oxidant" as used herein generally refers to oxidant formulations containing or capable of evolving at least one reactive oxygen species and can evolve at least one reactive carbon species. Such reactive species enhance the oxidative or reductive performance of the precursor formulation constituents.

The term "impaired water source" as used herein generally refers to a tank, gunbarrel, oil-water separator, holding pond, catchment, tanker truck, pipeline, well, well head, water collection facility, mine portal, surface water body, ground water body.

The term "mixer" as used herein generally refers to any device or method of blending one material or fluid with a receiving fluid. Mixers can provide high shear or low shear mixing conditions and include in-line static mixers, baffle mixers, orifice plate mixers, impeller mixers, venturi mixers, tank mixer, mixing in a pump head by an impeller, turbulent flow mixing in a progressing cavity pump head or turbulent flow mixing in a conduit such as a pipe, tube or hose.

The term "softener" as used herein generally refers to a material that is used to cause or assist in the removal of scaling minerals from a water stream including barium, calcium, magnesium, strontium, and silica. Softeners include sodium hydroxide, potassium hydroxide, soda ash, sodium carbonate, potassium carbonate, lime, quick lime, calcium hydroxide, sodium sulfate, potassium sulfate. Softeners can be used individually or in combination with one another.

The term "reactive coagulant" as used herein generally refers to a coagulant material that is altered when exposed to the reactive species oxidant in a way that promotes coagulation of impurities and flocculation of the reactive coagulant and coagulated materials. A reactive coagulant can include coagulant compounds added to an impaired water stream including, for example, ferric chloride, ferrous sulfate, ferrous chloride, aluminum chloride, aluminum chlorohydrate and other commercially formulated and branded products with similar reactive behaviors with reactive species oxidants. A reactive coagulant can also include dissolved and suspended transition metal complexes in the impaired water stream that react with reactive species oxidants including examples of iron, manganese, aluminum, and other transition metals.

The term "adsorbent" as used herein generally refers to a material to which impurities in impaired water adsorb such that the impurities are separated from water with the adsorbent. Adsorbents include, for example, activated charcoal, biochar, powdered activated carbon, bentonite clays, iron oxides, manganese oxides and zeolites.

The term "floc aid" as used herein generally refers to anionic polymers and cationic polymers and adsorbents used to flocculate suspended particles.

The term "clarifier" as used herein generally refers to a device or process used to separate suspended solids, oil and grease, polymers, gels and colloidal particles from a fluid stream including: a sedimentation tank, weir tank, dissolved air flotation, filtration.

The term "filter pod" as used herein generally refers to a device that contains one or more filtration media units including bag filters, sand filters, depth filters, polymer membrane filters, micro-porous ceramic filters.

The term "oil-water separator" as used herein generally refers to a device or process that separates oil from water such that the oil can be recovered. Oil-water separators include a gunbarrel, weir tank, weir tank with coalescing media, dissolved air flotation, centrifuge, and heater treater.

The term "pH adjuster" as used herein generally refers to a material that is used to adjust the pH of a fluid. pH Adjusters include acids such as hydrochloric acid, sulfuric acid, sodium bisulfate, potassium bisulfate, phosphoric acid, phosphonic acids acetic acid, citric acid, propionic acid, benzoic acid, and ethylenediaminetetraacetic acid (EDTA). pH Adjusters also include bases such as sodium hydroxide, and potassium hydroxide.

The term "oxidative clarification" as used herein generally refers to an approach to water clarification using a reactive species oxidant formulation The term "emulsifiers" as used herein generally refers to, for example, at least one foaming and antifoaming agents chosen from the group including: surfactants, oils, co-solvents and polymers including polyethylene glycol.

The term "foaming" and "antifoaming agents" as used herein generally refers to, for example, surfactants, oils, co-solvents and polymers including polytheylene glycol.

EMBODIMENTS

In some embodiments, oxidation chemistry may be used for separating and clarifying impaired water, reducing biological growth, and breaking emulsions. The oxidation chemistry used may have minimal impacts on pH and scaling potential of fluids. A relatively short-lived active oxidant may be a benefit for avoiding negative impacts on hydrocarbon quality and for minimizing oxidant corrosivity and environmental impacts. Selectivity of the oxidation chemistry towards different materials is also desirable for efficiency of oxidant use, compatibility with a variety of materials and avoidance of unnecessary or undesirable side reactions. Oxidant solutions that generate a variety of reactive oxygen species (ROS) in their treatment environments may be good candidates for achieving some or all of these attributes.

ROS may be generated in-situ by several chemical methods including the Fenton catalytic cycle with hydrogen peroxide and iron catalysts (produces hydroxyl and superoxide radicals), combining ozone with hydrogen peroxide (produces ozonides, radicals), and combining hypochlorite with hydrogen peroxide (singlet oxygen). Other methods of generating ROS may include photochemical approaches, which are generally very dilute in ROS and are not practical systems for down-hole well treatments or treatment of non-transmissive, highly scaling fluids or fluids with high turbidity including crude oil, flowback water, saline production water, black water, and emulsions. In some embodiments, emulsions may include oil in water emulsions, water in oil emulsions, and emulsions including a combination of oil, water and solids.

Some ROS (e.g., hydroxyl radical and ozonides) are too short lived and too reactive to be practical in highly contaminated or hydrocarbon environments. Salt and carbonate may rapidly quench the hydroxyl radical. Ozone and stronger oxidants, like hydroxyl radical, oxidize salts to form toxic chlorate and bromate byproducts. Chlorine-containing oxidant formulations are typically more corrosive than peroxides, are less efficient for $H_2S$ oxidation and rapidly chlorinate unsaturated hydrocarbons. Significant quantities of hydrogen peroxide used in ROS generation methods may promote emulsification of oils. The hydrogen peroxide itself may be a ROS oxidant consumer by being oxidized by or reacting with a variety of ROS chemistries.

In some embodiments, one preferred ROS-producing oxidant formulation is a peracetate solution. The peracetate solution may include generating an alkaline hydrogen peroxide solution from the combination of an alkali and a hydrogen peroxide concentrate, mixing the alkaline hydrogen peroxide solution with an acyl donor such that a peracetate solution concentrate is formed. In some embodiments, the peracetate solution may include peracetate anions and a peracid. In some embodiments, the peracetate solution may include a pH from about pH 10 to about pH 12. In some embodiments, the peracetate solution has a molar ratio of peracetate anions to peracid ranging from about 60:1 to about 6000:1. ROS-generating sodium peracetate solutions may contain no hydrogen peroxide, and are produced on site and on demand at alkaline pH. The sodium peracetate oxidant solution produces multiple ROS by itself and when placed into contaminated environments. In some embodiments, the ROS most important in sodium peracetate solutions include singlet oxygen, superoxide radical, hydroperoxyl radical, acetyloxy radical and potentially other radical fragments. When a combination of these ROS are generated together in sodium peracetate solutions they produce an oxidative-reductive potential (ORP) response in water that may exceed 900 mV (vs standard hydrogen electrode) around pH 7. These solutions may be more convenient and effective to use than other approaches. The dominant ROS may be selectively reactive such that they are effective in a variety of environments.

In some embodiments, a method may include making a reactive species formulation. The method may include providing an alkaline hydrogen peroxide solution. The method may include contacting the alkaline hydrogen peroxide solution with an acyl donor. A peracid concentrate may be produced by the contacting of the alkaline hydrogen peroxide with the acyl donor. The peracid concentrate may have a molar ratio of hydrogen peroxide to acyl donor reactive groups ranging from about 1:1.25 to about 1:4. The method may include maintaining the peracid concentrate pH value in a range from about pH 10 to about pH 12.

In some embodiments, a peracid composition may include a mixture of an alkali concentrate, hydrogen peroxide, and an acyl donor. The acyl donor may have a pH value ranging from about pH 10 to about pH 12. The acyl donor may have a first molar ratio of peracid anion to peracid acid ranging from about 60:1 to 6000:1. The acyl donor may have a second molar ratio of peracetate to hydrogen peroxide of 16:1 or more.

In some embodiments, a method of separating oil and water, may include: providing a mixture of oil and water and providing a peracid composition. The peracid composition may include a mixture of an alkali concentrate, a hydrogen peroxide and an acyl donor having a pH value ranging from about pH 10 to about pH 12. The peracid composition may include a first molar ratio of peracid anion to peracid acid ranging from about 60:1 to 6000:1. The peracid composition may include a second molar ratio of peracetate to hydrogen peroxide of 16:1 or more. The method may include contacting the peracid composition with the mixture of oil and water. In some embodiments, the method may include separating, after the contacting of the peracid composition and the mixture of oil and water, one of the oil and water from the other of the oil and water.

In some embodiments, a method of separating oil, water, and solids may include providing a mixture of oil, water and solids and providing a peracid composition. The peracid composition may include a mixture of an alkali concentrate, a hydrogen peroxide and an acyl donor having a pH value ranging from about pH 10 to about pH 12. The peracid composition may include a first molar ratio of peracid anion to peracid acid ranging from about 60:1 to 6000:1. The peracid composition may include a second molar ratio of peracetate to hydrogen peroxide of 16:1 or more. The method may include contacting the peracid composition with the mixture of oil and water. In some embodiments, the method may include separating, after the contacting of the peracid composition and the mixture of oil, water and solids, one of the oil, water and the solids from the others of the oil, water and the solids.

The presence of ROS or other reactive species in the formulations herein may in some cases be directly detected and it may be possible to determine the concentrations of certain reactive species (e.g., using spectroscopic methods). However, in some embodiment, in formulations herein the presence of reactive species may only be indirectly demonstrated by measurement of changing properties of the formulation (e.g., ORP measurements or pH change, by changes in concentration of precursors (e.g., rate of peroxyacetic acid concentration decline) or by changes in reactivity of the formulation (e.g., the rate of oxidation of dyes (bleaching rate)) or the rate or occurrence of oxidation of certain species (e.g., polysaccharide breakdown)).

The oxidative reductive potential (ORP) is a measure of how oxidizing or reducing a solution is relative to a standard reference potential measured in volts. Standard reference potentials are measured relative to the hydrogen/hydrogen ion reduction-oxidation potential of 0.000 V at unit activity for the standard hydrogen electrode (SHE). Generally, solutions with potentials greater than 0 V vs SHE are considered oxidizing (electron accepting) while solutions with potentials less than 0 V vs SHE are considered reducing (electron donating). The measured ORP of water is influenced by its pH or hydrogen ion activity. As the hydrogen ion activity (e.g., concentration, temperature) increases, the ORP of water increases to more positive values. ORP is also influenced by the presence of reducing or oxidizing agents relative to their standard reduction-oxidation potentials and solution activities.

Standard oxidation potentials are often cited to compare the oxidative strength of oxidants. The standard potential is a thermodynamic value which is always lower than the measured ORP in solution. This difference is caused by kinetic factors, such as the overpotential or activation barrier of electron transfer at an electrode surface and the solution activity of the oxidant, which is proportional to the concentration. Neither the standard potential nor ORP reflect the chemical reactivity of an oxidant regarding its reaction mechanism with a substrate, which is an additional kinetic factor.

For example, according to the standard potentials hydrogen peroxide is a stronger oxidant than hypochlorous acid. However, the ORP of hypochlorous acid (29 mM) at pH 7 is over 1.1 V (SHE) while the ORP of hydrogen peroxide (29 mM) at pH 7 is about 0.5 V (SHE) indicating that hypochlorous acid is the stronger oxidant. Free radicals of chlorine are strong electron acceptors and also rapidly attack and substitute unsaturated and aromatic hydrocarbons, amines, thiols, aldehydes, ketones, and biological materials such as DNA and proteins. Hydrogen peroxide is a strong electron acceptor, but it is not a free radical and is less chemically reactive than chlorine. This difference in chemical reactivity is reflected in the ORP. In practice, chlorine is used as a broad-spectrum biocide in water treatment whereas hydrogen peroxide is not. Hydrogen peroxide may be activated to form highly reactive free radicals (i.e., hydroxyl radical, superoxide) in various ways, e.g., by addition of a catalyst or irradiation with ultraviolet light.

ORP is used as a general measure of the antimicrobial strength of a solution containing an oxidizing antimicrobial agent, biocide or disinfectant. ORP may be correlated to relative oxidant concentration for lower oxidant concentrations at constant pH and temperature. This feature is the basis for ORP monitoring systems sometimes used in water treatment and disinfection processes where oxidant dose may be adjusted to maintain a desired ORP and corresponding biocidal activity for a particular oxidant.

Water solutions containing oxidizing biocides which have ORP's of greater than about 650 mV (SHE) are generally considered to be suitable for disinfection (Suslow, T. "Oxidation-Reduction Potential (ORP) for Water Disinfection Monitoring, Control, and Documentation" Univ. California Publication 8149 http://anrcatalog.ucdavis.edu which is incorporated by reference as if fully set forth herein) while ORP's above about 800 mV (SHE) are suitable for sterilization. Below about 475 mV (SHE) there is typically little to no biocidal activity for oxidizing biocides even after long contact times. Known exceptions to these ORP benchmarks include in-situ generation of short-lived reactive oxygen species such as hydroxyl radical, by ultraviolet-activated hydrogen peroxide, or singlet oxygen, by dye-sensitized photo-activation of molecular oxygen.

There are several limitations to ORP measurement as a method for evaluating antimicrobial activity. ORP is not sensitive to very short-lived reactive oxygen species such as hydroxyl radicals, singlet oxygen, hydrogen trioxide and hydroperoxide radical in the presence of parent oxidants such as, for example, hydrogen peroxide, peroxyacetic acid, molecular oxygen and ozone. ORP is not sensitive to non-oxidizing biocides and chemical reactivity which impart other mechanisms for disrupting cellular viability. Examples of non-oxidizing chemical biocides include glutaraldehyde, which acts by crosslinking protein structures, and antimicrobial quaternary ammonium compounds, which disrupt cell membranes. ORP is also insensitive to the tolerance of various microorganisms to a given biocide, which affects the concentration and contact time required to inactivate or destroy a specific microorganism. For example, chlorine use in water treatment is not effective against certain spores (e.g., *Cryptosporidium* oocysts) while chlorine dioxide and ozone are.

In some embodiments, the production of reactive oxygen species including singlet oxygen in the absence of hydrogen peroxide, production of superoxide by electrochemical generation and the combining of these reactive oxygen species in the presence of hydroperoxides is conducted to produce liquid formulations with enhanced ORP's and oxidation capabilities.

In some embodiments, methods of oxidation employ reactive oxygen species formulations as described herein. The oxidation method includes application of one or more selected reactive oxygen species formulations to an environment, a substrate in an environment or to a substrate that is to be subjected to oxidization. The terms environment and substrate are used herein broadly to refer to a place, a material, a chemical and/or a biological species that is to be subject to at least partial oxidation. The environment may be, among others, water in situ, for example, ground water, a pool, a pond, a tailing pond, an area of contaminated soil, industrial processing equipment (e.g., pipes, pumps, tanks and other container, filters, etc. to be cleaned in place). A substrate may be any item or place that are to be oxidatively cleaned for example, containers, tanks, pipes, counter tops, appliances, food preparation surfaces and equipment, food and beverage containers, filters, food items during food processing, that are subjected to oxidative cleaning.

In specific embodiments, the substrate is water containing undesirable chemical or biological species that are to be at least in part removed by oxidative treatment. Water to be treated includes waste water, greywater, raw water, ground water, tailing pond water, refinery waste water, frac flowback water, produced water, water from oil sands extraction processes, various industrial and food processing waters. In an embodiment, the environment or substrate is contaminated with higher than desirable levels of microorganisms wherein the environment or substrate is to be disinfected. The reactive oxygen species formulations may be used as antimicrobial agents, disinfectants and biocides. For example, the formulations may be used for cleaning and disinfection of medical or dental equipment, food processing equipment, containers and surfaces.

In some embodiments, the formulations may be used in various applications as oxidants and/or biocides. As described herein, different formulations, as assessed by ORP measurement and dye oxidation rate among other properties, may exhibit enhanced activity as a chemical oxidant or as a disinfectant or biocide.

In some embodiments, uses of the reactive oxygen species formulations are provided herein for various industrial or domestic oxidation, clean up and disinfection applications.

More specific applications include without limitation, Frac flowback water treatment and reuse; produced water treatment, refinery wastewater treatment, oil sands extraction and process water treatment; process water cleaning and reuse, waste water treatment, mine water treatment, cooling tower cleaning, cleaning/disinfections of water wells, pipes and containers, flue gas scrubbing water treatment, textile dye recycle and waste water treatment, pulp and paper processing waste water treatment and recycle, specialty bleaching applications.

Reactive oxygen species formulations may be employed as an antimicrobial agent or oxidizing agent for treatment of water, including without limitation, process streams or waste streams. Reactive oxygen species formulations may be used in water treatment: to cause chemical transformation or degradation of components or contaminants; to promote or enhance flocculation, micro-flocculation, coagulation and subsequent clarification and separation of inorganic and organic materials; to promote or enhance biological treatment processes; to promote or enhance wet peroxide oxidation processes; as a pretreatment, intermediary treatment or post treatment process to other treatment and separation processes.

In water treatment processes, the chlorine-free and bromine-free reactive oxygen species formulations may be used to provide for treatment without formation of undesired chlorinated or brominated byproducts. In water treatment processes, the chlorine-free and bromine-free active oxygen species formulations may be used to provide for treatment in the absence of chlorine dioxide and/or ozone.

For applications of the formulations herein the formulation is contacted with a substrate or environment to be oxidized or treated. Any means of contacting may be employed, that is suitable for retention of the oxidation activity of the formulation and that is suitable for the environment and/or substrate. Formulations are liquid and may be employed in a concentrated form or a diluted form. Formulations may be diluted, if desired, before, during or after initial contact. The concentration of formulations in contact with an environment and/or substrate may be varied during contact.

A given application may employ separate contacting events which may be the same or different and which may employ the same formulation or precursor formulation. A given application may employ contact with more than one formulation or precursor thereof. The environment and/or substrate may, for example, be contacted with an activated liquid formulation containing reactive oxygen species. Alternatively, the environment and/or substrate may be contacted with a liquid precursor formulation that will generate reactive oxygen species on activation and the formulation is activated as or after it comes into contact with the environment or substrate.

For example, the environment or substrate may itself provide for activation, such as a pH adjustment to the activation pH. One or more additional steps of activation to form additional reactive species may occur after the contact of the formulation or the precursor formulation with the environment and/or substrate. For example, steps of pH adjustment may occur after contact between the formulation and the environment or substrate. Contact with the environment or substrate may be controlled by addition of a selected volume or concentration of formulation or its precursor to the environment or in contact with the substrate. Alternatively, contact may occur by addition, including controlled addition of the substrate to the formulation or a precursor thereof.

Contact may be combined with stirring or other agitation, with scrubbing, scraping or other abrasive method if appropriate for the environment and/or substrate. Contact may be combined with removal of flocculant, precipitant or other solids present or formed in the environment or on contact with the substrate. The environment or substrate may be pre-treated prior to contact. The treated environment to substrate may be subject to another form of cleaning or disinfection.

Well casings and pipelines are serviced to remove bacterial growth, slime buildup, mineral scale deposits, corrosion and contamination. These issues are common among oil and gas production wells and pipelines, groundwater wells, raw water and wastewater pipelines and potable water and greywater distribution systems. Microbial control, removal of slime (the decaying remains of dead bacteria and other organic materials), microbial corrosion control and scale removal are significant maintenance issues for prolonging the production capacity and lifetime of a well. Pipelines carrying raw water, wastewater, produced water, greywater and other untreated water will encounter microbial growth and slime formation and will require cleaning. Methods for cleaning well bore casings and pipelines include chemical flushing with oxidizers and acids and mechanical cleaning such as brushing and scraping.

Compatibility of oxidants with seawater and brackish water is desirable in locations where there are no natural freshwater resources available. Flushing solution activity should persist for at least 5 hours and be effective in the range of pH 8-9. Ideally flushing solutions should be pH balanced and be safe for municipal disposal or discharge.

Recovered, spent flushing fluids will have a pH similar to that of seawater or groundwater and contain salinity, hardness (e.g., calcium/magnesium carbonate), suspended solids (e.g., iron or manganese oxides), suspended organic materials such as slime deposits, glycerol, acetate, surfactant and corrosion inhibitor additives, oxidation byproducts (e.g., nitrate, low molecular weight hydrocarbons) and potentially non-oxidized contaminants and microbes. The spent flushing fluids are optionally treated on site for discharge, sent to a municipal water treatment facility, disposed of in an injection well, or processed for water recovery and recycle back into well operations.

Biological control is one of the most critical issues in oil and gas exploration and production. Biological control is essential prior to sending water into a well as makeup water in drilling muds, hydraulic fracturing fluids and flood water. Similarly, biological control is necessary upstream of water treatment processes or prior to disposing of produced water, flowback water or other process waste water by deep well injection. Without effective biological control microorganisms from formation and surface environments, particularly sulfur-reducing, acid-forming and slime forming bacteria, will foul and degrade well casings, corrode pumps and equipment and foul the formation leading to accelerated loss of reservoir permeability and productivity. Oxidizing biocides are a fast-acting line of defense and represent a significant expense in operations. Oxidizing biocides should be very active and have a limited lifetime with no reactive residuals so that they do not interfere with non-oxidizing biocide chemicals used to provide longer-term biostatic conditions.

A general example of a treatment process where each stage may be incorporated, excluded or moved to a different location in the exemplary sequence depending on the influent composition and product water quality required for reuse, repurposing, discharge or further processing. Water to be treated enters the treatment process and treated product water exits, illustrated by exemplary outputs of different quality. The influent may be from any source, directly from a source of production, a side-stream or slip-stream of a process, or from an impoundment or storage vessel (e.g., tank or lagoon) or may have undergone pre-processing such as grit and solids separation, gas recovery and/or pH adjustment.

Pre-treatment steps are optionally applied. For example, volatile materials (e.g., volatile organic compounds, dissolved gases, ammonia) are optionally removed by air stripping. For example, readily oxidizable materials (e.g., dissolved or suspended metals like reduced iron and manganese) may optionally be pre-oxidized with oxygen in air to reduce the consumption of oxidants used downstream. This step is excluded when it is beneficial to deodorize or oxidize and degrade gaseous materials in the liquid phase or if the liquid stream is susceptible to foaming. One or more steps of filtering may be applied. Reactive oxygen species formulations are added to oxidize materials, provide a biocide, promote flocculation and/or enhance filtration and biological treatment performance. Reactive oxygen species formulations may contain alkalinity or acid for pH adjustment, precipitants, coagulants, antiscalants and demulsifiers. A separate source of acid or base may optionally be provided.

Biological treatment (aerobic and/or anaerobic) may be used to remove dissolved and suspended organic materials, metals, nutrients (e.g., nitrates, phosphates, sulfates) and reactive species oxidation byproducts. Clarification is used to remove free oil and grease, suspended solids (e.g., microflocculated solids and biological detritus), colloidal and dissolved organics and metals (e.g., Fe, Mn). Clarification methods may include coagulation and flocculation, electrocoagulation, flotation, settling, centrifugation, particle filtration (e.g., sand, dual media, micro- and ultra-filtration) and absorptive media. Forward osmosis filtration may be used as an alternative clarification process.

In some embodiments, ROS antimicrobial treatment may optionally be used as a final biocide prior to product water output as a biocidal pre-treatment to a water softening process and as a biocidal pre-treatment to a water softening and desalination process. Antimicrobial treatment may alternatively be used to increase the peroxide concentration prior to wet peroxide and wet ROS oxidation treatment.

In some embodiments, a water softening process may be provided including, for example, methods such as lime softening, ion exchange, absorptive media, nanofiltration and electro-capacitive deionization. Desalination process may include methods such as nanofiltration, reverse osmosis, forward osmosis, membrane distillation, thermal distillation, multi-effect distillation, electro-capacitive deionization, and electrodeionization.

Additional optional treatment may be provided dependent upon water quality desired. For example, wet peroxide oxidation treatment including elevated temperature, elevated pressure, a catalyst, a catalytic surface, and combinations of such conditions may be applied to promote wet peroxide. An additional step of wet ROS oxidation of organic and inorganic materials may also be applied.

In an embodiment, the water treatment process involves a peracetate oxidant solution injected as a liquid formulation into impaired water and after mixing solids are separated from the water stream resulting in clarified water which may be further used or stored. This is referred to as a "tier 1" process. Water treatment may be accomplished with a peracetate oxidant solution with little or no other chemical additives or treatments. The impaired water used in this treatment has limited contaminants.

FIG. 1 illustrates an example of a "Tier 1" water treatment process that incorporates a reactive species oxidant in a liquid formulation and little or no other chemical additives or treatments. Other chemistries used in combination with the reactive species oxidant serve to enhance the performance of the treatment process and also provide synergistic advantages when used in combination with the reactive species oxidant. A variety of unit processes may be used as needed to meet a range of water treatment goals and treated water quality specifications, but not every unit process in FIG. 1 is required in a given treatment process.

In an embodiment, impaired water from impaired water source 101 is fed through coarse filter 102 to remove large objects, sand, grit and other debris. The water then passes through a conduit where reactive species oxidant 103 and optional floc aid 105 are injected into the water stream and blended in mixer 106. After a period of mixing and contact time the water stream enters clarifier 107 where suspended solids are separated from the water stream. The clarified water then optionally passes through filter pod 108 to remove any remaining suspended solids. The clarified water then passes through a conduit where reactive species oxidant 109 is optionally injected into the water stream and blended in mixer 110 to reduce bacteria population in a final polishing step. The treated water stream is finally conveyed to a storage vessel, reused, discharged, disposed of or further treated by other processes 112. Results of this process include enhanced oil and organic phase separation. Sodium peracetate oxidant solutions are not previously known to be used in oil separation or water treatment.

Figure 2:
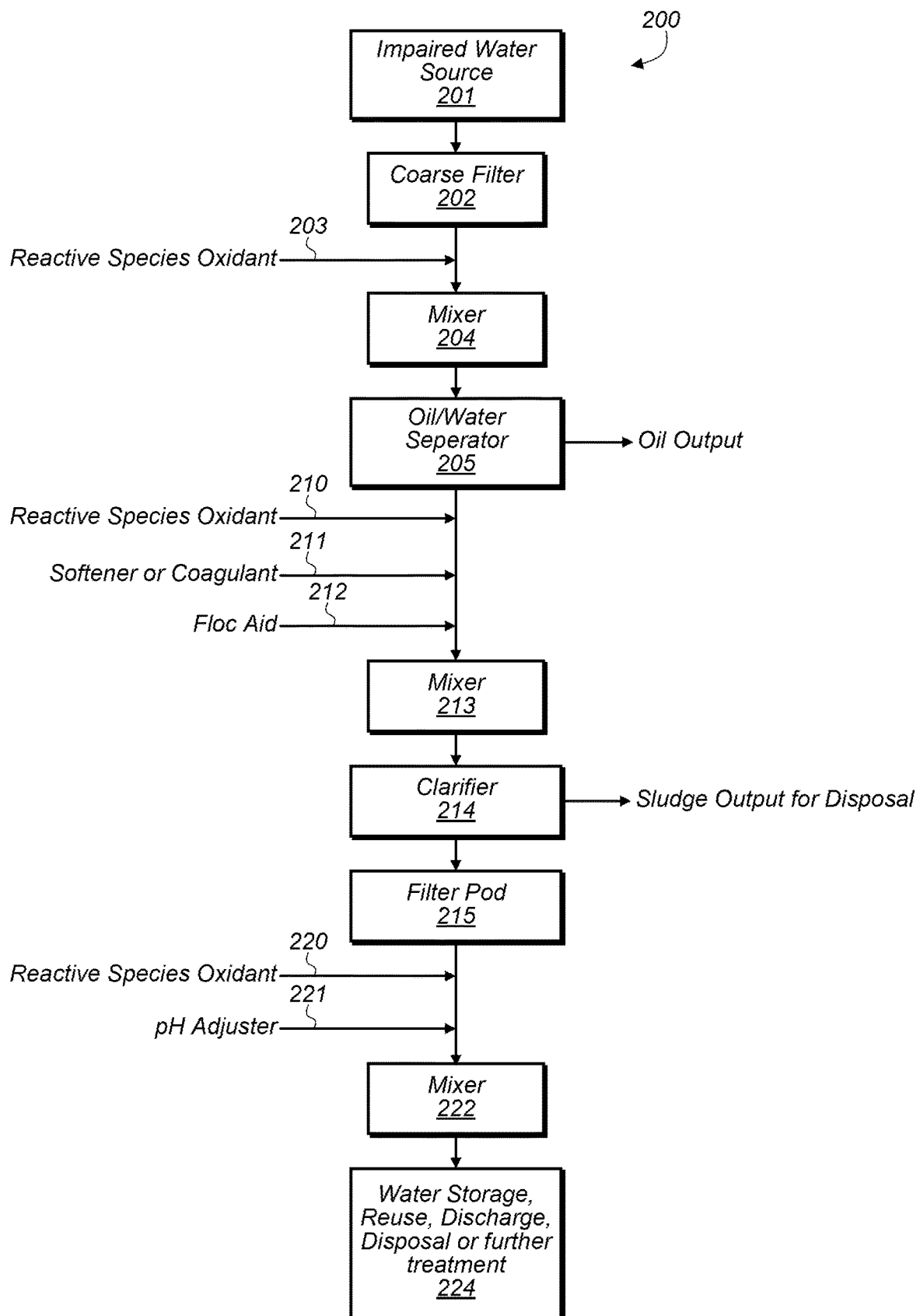
FIG. 2 depicts a schematic representation of a flow chart of the method to separate and clarify impaired water, referred to herein as a Tier 2 process.

In an embodiment, FIG. 2 illustrates an example of a "Tier 2" water treatment process that incorporates a reactive species oxidant in a liquid formulation and other chemical additives or treatments to promote a modest level of water softening and enhance clarification when treating more highly impaired water. An oil/water separation step is also included in this example to illustrate enhanced oil recovery from a produced water stream prior to water treatment. Other chemistries used in combination with the reactive species oxidant serve to enhance the performance of the treatment process and also provide synergistic advantages when used in combination with the reactive species oxidant. A variety of unit processes may be used as needed to meet a range of water treatment goals and treated water quality specifications, but not every unit process in FIG. 2 is required in a given treatment process.

Impaired water from impaired water source 201 is fed through coarse filter 202 to remove large objects, sand, grit and/or other debris. The water then passes through a conduit where reactive species oxidant 203 is injected into the water stream and blended in a low-shear mixer 204. The mixture enters oil/water separator 205 where oil-water emulsions break and allow oil droplets to coalesce into a bulk oil phase for recovery and impurities such as asphaltenes are separated by sedimentation.

The water phase exits oil/water separator 205 and passes through a conduit where reactive species oxidant 210, softener 211 and/or floc aid 212 are injected into the water stream and blended in mixer 213.

In some embodiments, an amount of contact time may be added between softener 211 and floc aid 212 by means of a contact basin or extended pipe run (not shown) to promote precipitation of scaling minerals prior to clarifying. After a period of mixing and contact time the water stream enters clarifier 213 where suspended solids are separated from the water stream. The clarified water then optionally passes through filter pod 215 to remove any remaining suspended solids. The clarified water then passes through a conduit where reactive species oxidant 220 is optionally injected into the water stream and pH adjuster 221 is optionally injected into the water stream and blended in mixer 222 to reduce bacteria population and balance pH in a final polishing step. The treated water stream is finally conveyed to a storage vessel, reused, discharged, disposed of or further treated by other processes 224.

Figure 3:
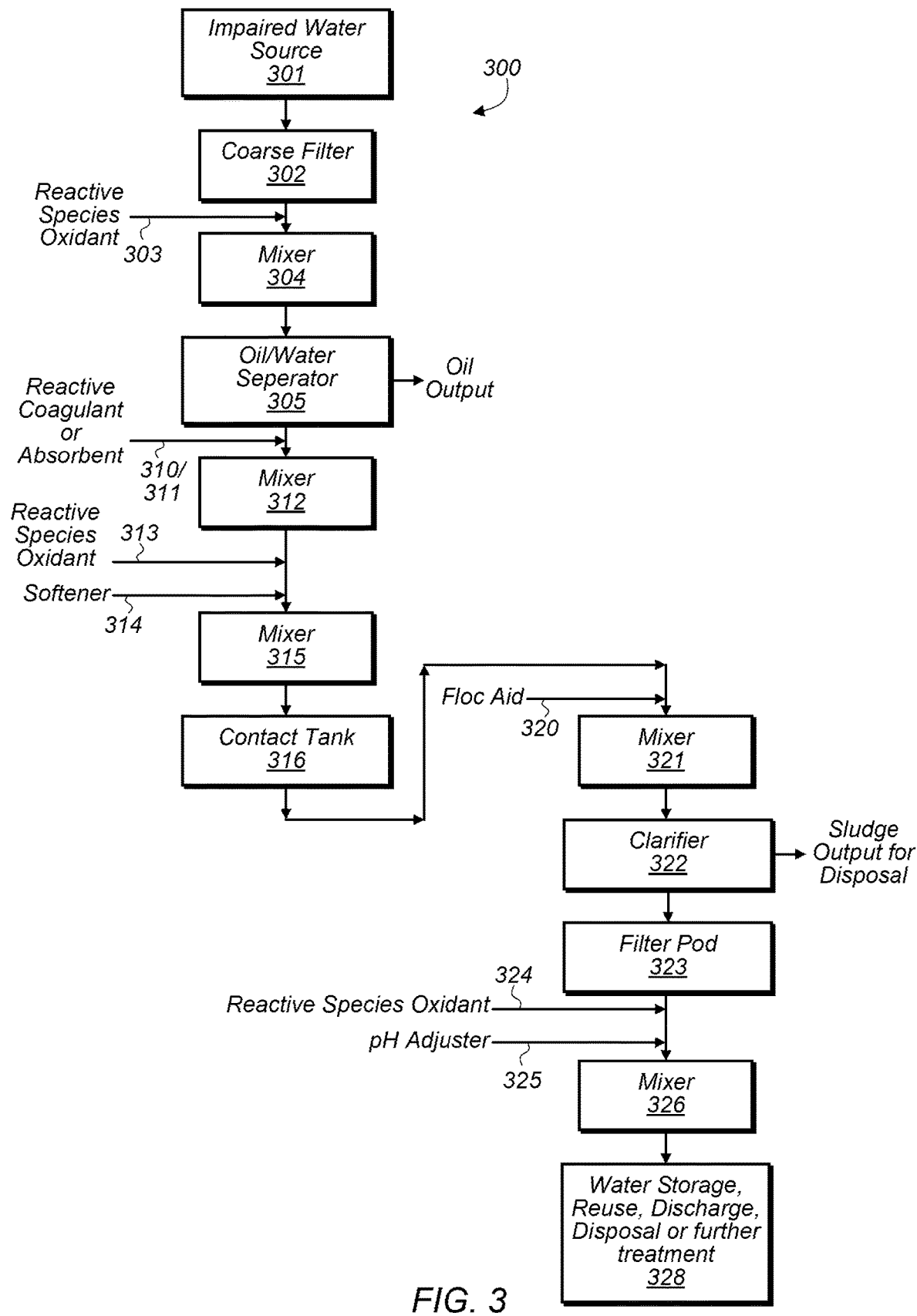
FIG. 3 depicts a schematic representation of a flow chart of the method to separate and clarify impaired water, referred to herein as a Tier 3 process.

In an embodiment, FIG. 3 illustrates an example of a "Tier 3" water treatment process that incorporates a reactive species oxidant in a liquid formulation and other chemical additives or treatments to promote a greater level of water softening and high level of impurity removal to enhance clarification when treating heavily impaired water or meeting more stringent water quality specifications. An oil/water separation step may be included in this example to illustrate enhanced oil recovery from a produced water stream prior to water treatment. Other chemistries used in combination with the reactive species oxidant serve to enhance the performance of the treatment process and also provide synergistic advantages when used in combination with the reactive species oxidant. A variety of unit processes may be used as needed to meet a range of water treatment goals and treated water quality specifications, but not every unit process in FIG. 3 is required in a given treatment process.

Impaired water from impaired water source 301 is fed through coarse filter 302 to remove large objects, sand, grit and other debris. The water then passes through a conduit where reactive species oxidant 303 is injected into the water stream and blended in a low-shear mixer 304. The mixture enters oil/water separator 305 where oil-water emulsions break and allow oil droplets to coalesce into a bulk oil phase for recovery and impurities such as asphaltenes may be separated by sedimentation.

The water phase exits oil/water separator 305 and passes through a conduit where reactive coagulant 310 or adsorbent 311 is injected into the water stream and blended in mixer 312. After a contact time period the water mixture passes through a conduit where reactive species oxidant 313 and softener 314 are injected into the water stream which then passes through mixer 315 and into contact tank 316. In some embodiments, the water is mixed while in contact tank 316.

The water mixture exits contact 316 and passes through a conduit where floc aid 320 is injected into the water stream and blended in mixer 321. After an optional contact time period the water stream enters clarifier 322. The clarified water then optionally passes through filter pod 323 to remove any remaining suspended solids. The clarified water then passes through a conduit where reactive species oxidant 324 is optionally injected into the water stream and pH adjuster 325 is optionally injected into the water stream and blended in mixer 326 to reduce bacteria population and balance pH in a final polishing step. The treated water stream is finally conveyed to a storage vessel, reused, discharged, disposed of or further treated by other processes 328.

Flocculation may be caused by oxidant which is until now unexpected and unknown for a sodium peracetate oxidant solution. In contrast, flocculation typically does not occur when using chlorine dioxide oxidant. Enhanced flocculation provided by oxidant and its synergy with flocculation polymers provides improved blanket formation and clearer supernatant in a dissolved air flotation (DAF) clarifier. Improvements are relative to using chlorine based oxidants.

Sludge quality (stability and density) may be tailored to different separation and disposal methods depending on oxidant dose concentration; concentration of iron and other transition metals (as impurities or additives); and flocculation polymer used.

Unexpected synergy between oxidant and anionic flocculation polymers has been observed, which reduces the amount of flocculation polymer needed to separate suspended solids while the concurrent use of flocculation polymer reduces the oxidant demand from suspended impurities.

ORP response of chemistry may allow for accurate ORP monitoring and control of oxidant dose rate when treating water. This is especially important for "frac on the fly" water treatment where residual oxidant must be minimized or zero before using treated water to make new crosslinked, gel-based hydraulic fracturing fluids or slickwater hydraulic fracturing fluids.

Adding "reactive" iron to wastewater being treated with oxidant may provide a source of an in-situ coagulant. It creates an effective iron oxyhydroxide floc which co-precipitates impurities from the impaired water. Using reactive iron as a coagulant at neutral or alkaline pH is different than using ferrous sulfate as a peroxide catalyst in a Fenton oxidation process at acid pH.

In some embodiments, multiple dose pumps may draw off of a single oxidant generation system's buffer tank to provide multiple dosing points in a treatment process using a single generation system. The speed of each dose pump may be individually controlled based on feedback from a process stream flow sensor, ORP sensor or other oxidant dose-controlling feedback mechanism.

In some embodiments, injecting smaller amounts of oxidant at multiple points into an impaired water treatment process may increase the overall performance efficiency of the oxidant in contrast to injecting a single high dose equal to the sum of sequential lower doses.

The oxidant solution is alkaline as made from hydrogen peroxide, sodium hydroxide and triacetin, but the solution pH decreases to near neutral after the active ingredients have been consumed and its reactive oxygen producing activity ceases. Because of this behavior the pH of water treated with alkaline oxidant is not significantly affected. This pH behavior was unexpected and results in no further pH adjustment required after injecting.

Figure 4:
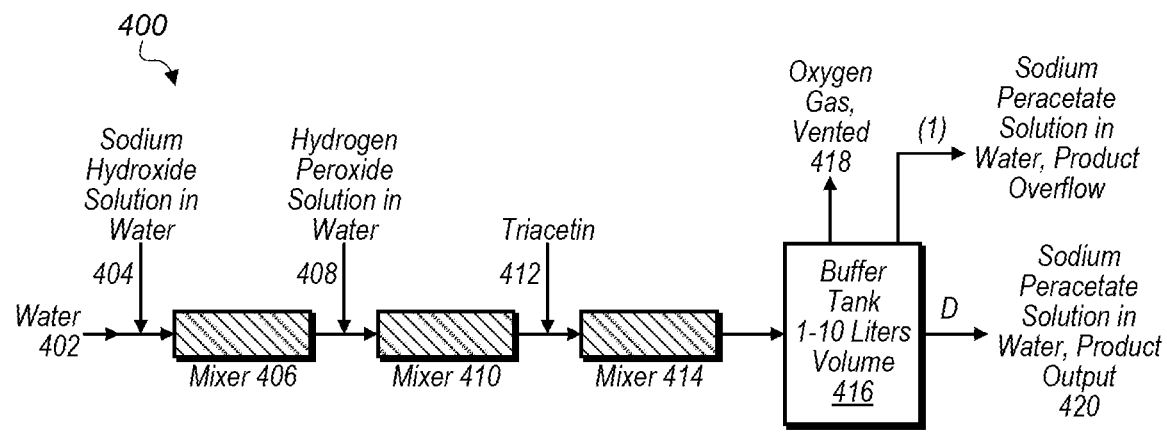
FIG. 4 depicts a schematic representation of a general process shown in the diagram of unit operations for a continuous production of sodium peracetate oxidant solution.

In some embodiments, a method may include the continuous production of a sodium peracetate oxidant solution. The peracetate oxidant solution generator may follow the general process shown in the diagram of unit operations 400 in FIG. 4. The production process is continuous and intermediate conversion products may not be isolated. In this process a softened water or potable water stream 402 is combined with an alkali concentrate 404 and blended in Mixer 406. A hydrogen peroxide solution 408 may be added to the alkali stream and reacts in Mixer 410 to form alkaline hydrogen peroxide substantially in the form of sodium peroxide. An acyl or acetyl donor material 412, is then added to the alkaline hydrogen peroxide stream and reacts in Mixer 414 to form the peracetate oxidant solution 420, which is collected in the product buffer tank 416. While the peracetate solution is in the product buffer tank gases 418 such as oxygen evolved by the product solution may escape through a gas vent. If the buffer tank is over filled the excess volume may drain from the top of the tank into a catchment through a product overflow line. The gas vent and product overflow line may share the same conduit. The peracetate product solution is dispensed from the buffer tank at a rate that is less than or equal to the production rate of peracetate product solution.

In hot environments, up to about 105° F. (41° C.), the generator process may be cooled by chilling the feed water prior to it entering the system and the chilled water cools the other feed streams to produce a cooler product, which reduces the degradation rate of the oxidant. For example, a 750 watt refrigerated water chiller may be placed in-line between the particle filter and water softening filter where it reduces the temperature of the feed water to 50° F. before it enters the oxidant generator. The chilled water may absorb heat from the other feed streams and keep the product solution temperature between about 60 and 80° F. (16-27° C.).

In cool environments, below about 40° F. (4° C.), water and chemical feed tank heaters may be necessary to prevent large increases in viscosity or freezing of feedstocks.

The in-line mixer may be a static mixer, an orifice mixer, a plate-type mixer, a baffled mixer, turbulent flow in a tube or pipe, a chamber outfitted with a rotating impeller, a pump impeller. An in-line mixer may include a combination of mixer types. An in-line mixer may be used as a chemical reaction chamber. An in-line mixer used as a chemical reaction chamber may be designed with a length or volume that extends the residence time of a mixture in a mixing stage such that the reaction time is increased.

The water and three liquid chemical feeds are metered into the generator process by four metering pumps. Metering pumps may include positive displacement pumps such as tube pumps, hose pumps and diaphragm metering pumps. Metering pumps with the least pulsation or fluctuation in flow rate are preferred. Pulsation dampening devices positioned on the metering pump outlets may be used to decrease pressure and flow rate fluctuations.

One example of controlling the oxidant solution production rate is to set each of the four metering pump speeds to a fixed rate and to switch all of them on and off simultaneously where their run time or duty cycle is controlled by the volume of oxidant solution in the product buffer tank. A feedback loop between a dual level switch in the product buffer tank, which triggers the pumps to run when a minimum liquid level is reached in the product buffer tank and triggers the pumps to stop when a maximum liquid level is reached in the product buffer tank. The time it takes to draw down the oxidant solution from the maximum to the minimum liquid level determines an approximate residence time of oxidant in the buffer tank. Ideally, this residence time should be minimized to minimize the loss of oxidant concentration before it is dispensed for use. In some embodiments, a preferred maximum residence time for a 3% to 5.5% sodium peracetate solution is about 5 minutes.

Once the peracetate oxidant solution concentrate is made the evolution of oxygen begins as a result of the singlet oxygen forming reaction between peracetate anion and peracetic acid. After the peracetate solution saturates with oxygen, oxygen gas is released. While the oxidant solution is in the product buffer tank, the oxygen gas released from solution is vented. However, when oxidant solution is drawn from the buffer tank to be dispensed, the oxidant solution becomes contained within a pipe or tube (a conduit), where excess gas cannot escape. The excess gas then occupies a fraction of the volume in the pipe or tube, thus creating a gas load through the metering pump used to dispense the oxidant solution.

In some embodiments, minimizing the volume of gas prior to the metering pump and having a consistent volume of gas are two methods of providing a consistent output flow of oxidant solution. The fraction of gas volume in the product stream passing through the metering pump is preferably less than 25% of the total fluid volume and more preferably less than 10% of the total fluid volume.

Minimizing the fraction of gas volume in the product stream may be achieved by several methods.

A first method may be to increase the pH of the peracid oxidant solution, whereby the ratio of peracid anion to peracetic acid is increased and the absolute concentration of peracetic acid is decreased in order to decrease the reaction rate which leads to the evolution of oxygen gas byproduct. The pH of the peracid oxidant solution may be increased by increasing the feed rate of sodium hydroxide into the system accompanied by a proportionate decrease in feed rate of water into the system.

A second method may be to decrease the concentration of peracid oxidant in the product solution to decrease the reaction rate which leads to the evolution of oxygen gas byproduct. The feed rate of water into the system may be increased without changing the mass of oxidant material being produced; or the feed rates of sodium hydroxide, hydrogen peroxide and triacetin may be proportionately decreased without changing the volume of oxidant solution being produced.

A third method may be to cool the product solution to decrease the reaction rate which leads to the evolution of oxygen gas byproduct.

A fourth method may be to decrease the length of conduit between the product buffer tank and the inlet of the metering pump that dispenses the product to reduce the residence time during which gas buildup may occur in the conduit.

A fifth method may be to increase the pressure of the product fluid to reduce the gas volume in the conduit between the product buffer tank and the inlet of the metering pump that dispenses the product. Increasing the head pressure of product solution above the conduit or increasing the head pressure in the product buffer tank above the fluid level are two examples of approaches to achieving this.

A sixth method may be to decrease the residence time of the oxidant solution in the product buffer tank whereby the product has less time to produce gas in an amount greater than its saturation concentration in the product solution. This may be achieved by reducing the difference in height between the high and low switch levels of the dual level switch in the product buffer tank; and/or reducing the volume of the product buffer tank; and/or reducing the difference between the oxidant dispensing rate and the oxidant production rate determined by the water and feedstock metering pumps. A single method or preferably a combination of methods may be employed to minimize the fraction of gas volume in the product stream.

In some embodiments, there may be more than one location in a water treatment process where an oxidant is added into the water stream being treated. For example, oxidant may be added prior to an oil-water separator to enhance emulsion breaking; then oxidant may be added before a clarifier to oxidize, coagulate and flocculate contaminants; then oxidant may be added as a biocide before the treated water goes into a storage tank, a water hauling truck or a disposal well. A single oxidant solution generator may be outfitted with, for example, three metering pumps for dispensing the oxidant solution from the product buffer tank to each of the three locations for oxidant addition into the water treatment process. Each of the three metering pumps may be controlled independently to dispense the amount required at each location. The product buffer tank level switch feedback loop will control the generator's production rate with the proper feedstock ratios, even if any or all of the three metering pumps are changing in their speed or turning on and off over time.

ORP sensitivity to residual oxidant concentration is not possible with a wastewater treated with hydrogen peroxide or "merchant" peracetic acid (equilibrium peracetic acid). Activated peracetate solutions provide a large ORP response and their dose concentration/rate may be monitored and controlled by measurement of ORP.

In some embodiments, removal of residual peracetate oxidant may be achieved by contacting treated water with a simple media to decompose it, such as using a sand filter's media.

In some embodiments, the continuous production of a biocide composition comprising hypochlorite and hydrogen peroxide combined in a 10:1 mass ratio or greater is achieved. The continuous production of a reactive species formulation on site for industrial scale uses presents several unique challenges specific to each type of reactive species formulation produced. An apparatus that generates a biocide composition comprising hypochlorite and hydrogen peroxide shares several similar features to that of the apparatus in Example 43. The apparatus must provide consistent feedstock feed ratios, one or more chemical reaction stages, variable product output flow rate, minimal residence time of the product, minimal holdup volume of the product and, because the product formulation releases oxygen gas, management of the gas load in the product stream to provide a consistent gas to liquid ratio for consistent dispensing of the liquid product. There should also be opportunities for thermal management when needed.

Figure 5:
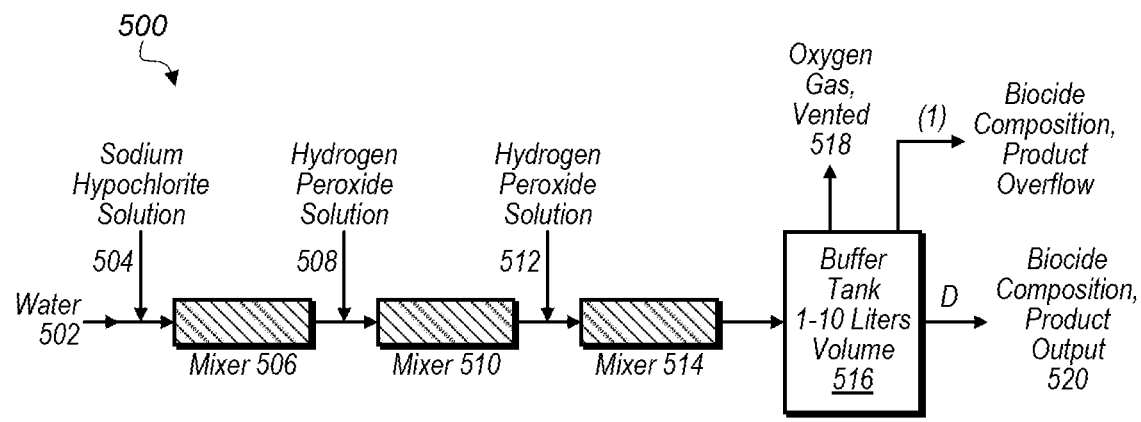
FIG. 5 depicts a schematic representation of a general process shown in the diagram of unit operations for a continuous production of oxidant solution in a biocide composition generator.

In some embodiments, the biocide composition generator follows the general process shown in the diagram of unit operations 500 in FIG. 5. The production process is continuous and intermediate conversion products are not isolated. In this process a softened water or potable water stream 502 may be combined with a hypochlorite concentrate 504 and blended in Mixer 506. In some embodiments no water is added to the hypochlorite concentrate. A first portion of hydrogen peroxide solution 508 may be added to the dilute hypochlorite stream and reacts in Mixer 510 to form a first biocide composition comprising a first mass ratio of hypochlorite to hydrogen peroxide greater than or equal to a 10:1. Optionally, a second portion of hydrogen peroxide solution 512 may be added to the first biocide composition and reacts in Mixer 514 to form a biocide composition of a second mass ratio of hypochlorite to hydrogen peroxide greater than or equal to a 10:1, total. Optionally, this sequential addition of hydrogen peroxide to the biocide composition followed by mixing may be repeated a greater number of times as long as the hypochlorite to hydrogen peroxide mass ratio remains greater than or equal to a 10:1, total. Smaller, portions of H2O2 added sequentially may reduce parasitic losses of oxidants during mixing and increase production efficiency and biocidal activity. The final biocide composition is collected in the product buffer tank 516 where oxygen gas 518 released by the initial reaction between hypochlorite and hydrogen peroxide may escape the composition through a gas vent. If the buffer tank is over filled the excess volume may drain from the top of the tank into a catchment through a product overflow line. The gas vent and product overflow line may share the same conduit. The biocide composition product solution 520 is dispensed from the buffer tank at a rate that is less than or equal to the production rate of biocide composition product solution.

In hot environments, up to about 105° F. (41° C.), the generator process may be cooled by chilling the feed water prior to it entering the system and the chilled water cools the other feed streams to produce a cooler product, which reduces the degradation rate of the oxidant. For example, a 750 watt refrigerated water chiller may be placed in-line between the particle filter and water softening filter where it reduces the temperature of the feed water to 50° F. before it enters the oxidant generator. The chilled water may absorb heat from the other feed streams and keep the product solution temperature between about 60 and 80° F. (16-27° C.).

In cool environments, below about 40° F. (4° C.), water and chemical feed tank heaters may be necessary to prevent large increases in viscosity or freezing of feedstocks.

The in-line mixer may be a static mixer, an orifice mixer, a plate-type mixer, a baffled mixer, turbulent flow in a tube or pipe, a chamber outfitted with a rotating impeller, a pump impeller. An in-line mixer may include a combination of mixer types. An in-line mixer may be used as a chemical reaction chamber. An in-line mixer used as a chemical reaction chamber may be designed with a length or volume that extends the residence time of a mixture in a mixing stage such that the reaction time is increased.

The water and three liquid chemical feeds may be metered into the generator process by three or more metering pumps. Metering pumps may include positive displacement pumps such as tube pumps, hose pumps and diaphragm metering pumps. Metering pumps with the least pulsation or fluctuation in flow rate may be employed. Pulsation dampening devices positioned on the metering pump outlets may be used to decrease pressure and flow rate fluctuations.

An example of controlling the oxidant solution production rate is to set each of the three or more metering pump speeds to a fixed rate and to switch all of them on and off simultaneously where the run time or duty cycle is controlled by the volume of oxidant solution in the product buffer tank. A feedback loop may include a dual level switch in the product buffer tank, which triggers the pumps to run when a minimum liquid level is reached in the product buffer tank and triggers the pumps to stop when a maximum liquid level is reached in the product buffer tank. The time it takes to draw down the oxidant solution from the maximum to the minimum liquid level determines an approximate residence time of oxidant in the buffer tank. Ideally, this residence time should be minimized to minimize the loss of oxidant concentration before it is dispensed for use. A maximum residence time for the biocide composition is about 5-30 minutes or about 15 minutes.

When the biocide composition is first made the bulk of oxygen gas evolution may occur. After the biocide composition saturates with oxygen, oxygen gas is released. While the oxidant solution is in the product buffer tank, the oxygen gas released from solution may be vented. However, when oxidant solution is drawn from the buffer tank to be dispensed, the oxidant solution may become contained within a pipe or tube (a conduit), where excess gas cannot escape. The excess gas may then occupy a fraction of the volume in the pipe or tube, thus creating a gas load through the metering pump used to dispense the oxidant solution. Minimizing the volume of gas prior to the metering pump and having a consistent volume of gas are two examples of methods of providing a consistent output flow of oxidant solution. The fraction of gas volume in the product stream passing through the metering pump is preferably less than about 25% of the total fluid volume and more preferably less than 10% of the total fluid volume.

Minimizing the fraction of gas volume in the product stream may be achieved by several methods.

A first method may be to decrease the concentration of biocide composition in the product solution to decrease the reaction rate which leads to the evolution of oxygen gas byproduct. The feed rate of water into the system may be increased without changing the mass of oxidant material being produced; or the feed rates of sodium hypochlorite and hydrogen peroxide may be proportionately decreased without changing the volume of oxidant solution being produced.

A second method may be to cool the product solution to decrease the reaction rate which leads to the evolution of oxygen gas byproduct.

A third method may be to decrease the length of conduit between the product buffer tank and the inlet of the metering pump that dispenses the product to reduce the residence time during which gas buildup may occur in the conduit.

A fourth method may be to increase the pressure of the product fluid to reduce the gas volume in the conduit between the product buffer tank and the inlet of the metering pump that dispenses the product. Increasing the head pressure of product solution above the conduit or increasing the head pressure in the product buffer tank above the fluid level are two examples of approaches to achieving this.

A fifth method may be to decrease the residence time of the biocide composition in the product buffer tank whereby the product has less time to produce gas in an amount greater than its saturation concentration in the product solution. This may be achieved by reducing the difference in height between the high and low switch levels of the dual level switch in the product buffer tank; and/or reducing the volume of the product buffer tank; and/or reducing the difference between the oxidant dispensing rate and the oxidant production rate determined by the water and feedstock metering pumps. A single method or a combination of methods may be employed to minimize the fraction of gas volume in the product stream.

There is often more than one location in a water treatment process where an oxidant is added into the water stream being treated. A single oxidant solution generator may be outfitted with, for example, three metering pumps for dispensing the oxidant solution from the product buffer tank to each of the three locations for oxidant addition into the water treatment process. Each of the three metering pumps may be controlled independently to dispense the amount required at each location. The product buffer tank level switch feedback loop may control the generator's production rate with the proper feedstock ratios, even if any or all of the three metering pumps are changing in their speed or turning on and off over time.

In some embodiments, the continuous production of sodium peracetate-superoxide oxidant solution is achieved. The continuous production of a reactive species formulation on site for industrial scale uses presents several unique challenges specific to each type of reactive species formulation produced. An apparatus that generates peracetate-superoxide oxidant solutions must provide consistent feedstock feed ratios, chemical reaction stages, variable product output flow rate, minimal residence time of the product, minimal holdup volume of the product and, because the product formulation releases oxygen gas, management of the gas load in the product stream to provide a consistent gas to liquid ratio for consistent dispensing of the liquid product. There should also be opportunities for thermal management as needed.

Figure 6:
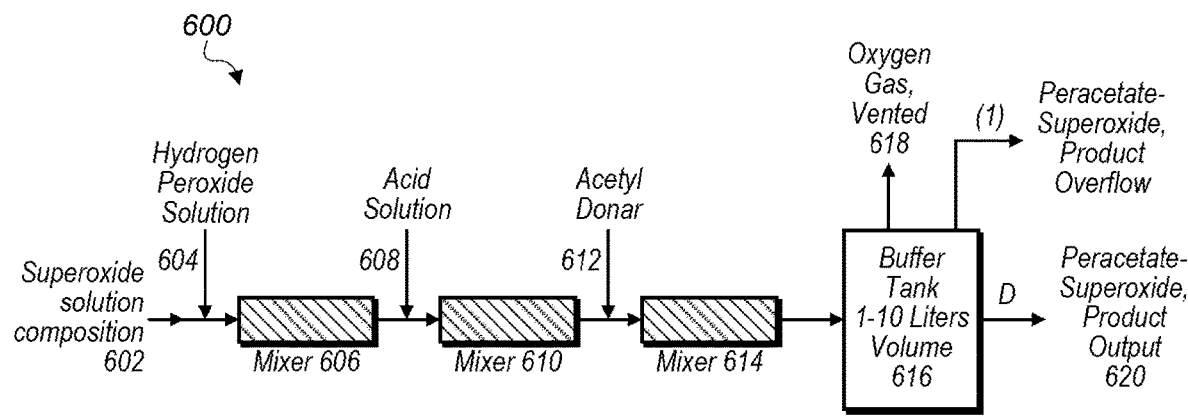
FIG. 6 depicts a schematic representation of a general process shown in the diagram of unit operations for a continuous production of peracetate-superoxide oxidant solution generator.

In some embodiments, the peracetate-superoxide oxidant solution generator follows the general process shown in the diagram of unit operations 600 in FIG. 6. The production process is continuous and intermediate conversion products are not isolated. In this process a stabilized alkaline hydrogen peroxide and superoxide solution composition 602 is optionally combined with a hydrogen peroxide solution 604 to adjust the peroxide to superoxide ratio and blended in Mixer 606. The resulting mixture may be combined with an acid solution 608 or concentrate and blended in Mixer 610 to reduce the pH to less than or equal to pH 13 if necessary. An acyl or acetyl donor material 612 may be added to the alkaline hydrogen peroxide and superoxide mixture and mixed in Mixer 614 to form the peracetate-superoxide oxidant solution, which is collected in the product buffer tank 616. While the peracetate-superoxide solution is in the product buffer tank gases such as oxygen 618 may be evolved by the product solution may escape through a gas vent. If the buffer tank is over filled the excess volume may drain from the top of the tank into a catchment through a product overflow line. The gas vent and product overflow line may share the same conduit. The peracetate-superoxide product solution 620 may be dispensed from the buffer tank at a rate that is less than or equal to the production rate of peracetate product solution.

The in-line mixer may be a static mixer, an orifice mixer, a plate-type mixer, a baffled mixer, turbulent flow in a tube or pipe, a chamber outfitted with a rotating impeller, a pump impeller. An in-line mixer may include a combination of mixer types. An in-line mixer may be used as a chemical reaction chamber. An in-line mixer used as a chemical reaction chamber may be designed with a length or volume that extends the residence time of a mixture in a mixing stage such that the reaction time is increased.

The alkaline hydrogen peroxide-superoxide, optionally hydrogen peroxide, acid and acyl or acetyl donor liquid chemical feeds may be metered into the generator process by four metering pumps. Metering pumps may include positive displacement pumps such as tube pumps, hose pumps and diaphragm metering pumps. Metering pumps with the least pulsation or fluctuation in flow rate may be used. Pulsation dampening devices positioned on the metering pump outlets may be used to decrease pressure and flow rate fluctuations.

One example of controlling the oxidant solution production rate may include to set each of the four metering pump speeds to a fixed rate and to switch all of them on and off simultaneously where their run time or duty cycle is controlled by the volume of oxidant solution in the product buffer tank. A feedback loop may include a dual level switch in the product buffer tank, which triggers the pumps to run when a minimum liquid level is reached in the product buffer tank and triggers the pumps to stop when a maximum liquid level is reached in the product buffer tank. The time it takes to draw down the oxidant solution from the maximum to the minimum liquid level may determine an approximate residence time of oxidant in the buffer tank. Ideally, this residence time should be minimized to minimize the loss of oxidant concentration before it is dispensed for use. A preferred maximum residence time for a 0.5% to 1.5% sodium peracetate and sodium superoxide solution is about 10 minutes.

Once the peracetate-superoxide oxidant solution concentrate is made the evolution of oxygen may begin as a result of the singlet oxygen forming reaction between peracetate anion and peracetic acid. After the peracetate solution saturates with oxygen, oxygen gas is released. While the oxidant solution is in the product buffer tank, the oxygen gas released from solution is vented. However, when oxidant solution is drawn from the buffer tank to be dispensed, the oxidant solution becomes contained within a pipe or tube (a conduit), where excess gas cannot escape. The excess gas may then occupy a fraction of the volume in the pipe or tube, thus creating a gas load through the metering pump used to dispense the oxidant solution. Minimizing the volume of gas prior to the metering pump and having a consistent volume of gas may be two methods of providing a consistent output flow of oxidant solution. The fraction of gas volume in the product stream passing through the metering pump is preferably less than 25% of the total fluid volume and more preferably less than 10% of the total fluid volume.

Minimizing the fraction of gas volume in the product stream may be achieved by several methods.

A first method may be to increase the pH of the peracid-superoxide oxidant solution, whereby the ratio of peracid anion to peracetic acid is increased, the superoxide to hydroperoxyl radical ratio is increased and the absolute concentration of peracetic acid is decreased in order to decrease the reaction rates which lead to the evolution of oxygen gas byproduct. The pH of the peracid-superoxide oxidant solution may be increased by decreasing the feed rate of acid solution.

A second method may be to decrease the concentration of peracid-superoxide oxidant in the product solution to decrease the reaction rate which leads to the evolution of oxygen gas byproduct. The concentration of alkaline hydrogen peroxide-superoxide solution fed into the generator may be decreased.

A third method may be to cool the product solution to decrease the reaction rate which leads to the evolution of oxygen gas byproduct.

A fourth method may be to decrease the length of conduit between the product buffer tank and the inlet of the metering pump that dispenses the product to reduce the residence time during which gas buildup may occur in the conduit.

A fifth method may be to increase the pressure of the product fluid to reduce the gas volume in the conduit between the product buffer tank and the inlet of the metering pump that dispenses the product. Increasing the head pressure of product solution above the conduit or increasing the head pressure in the product buffer tank above the fluid level may be two approaches to achieving this.

A sixth method may be to decrease the residence time of the oxidant solution in the product buffer tank whereby the product has less time to produce gas in an amount greater than its saturation concentration in the product solution. This may be achieved by reducing the difference in height between the high and low switch levels of the dual level switch in the product buffer tank; and/or reducing the volume of the product buffer tank; and/or reducing the difference between the oxidant dispensing rate and the oxidant production rate determined by the water and feedstock metering pumps.

A single method or a combination of methods are employed to minimize the fraction of gas volume in the product stream.

There may be more than one location in a water treatment process where an oxidant is added into the water stream being treated. For example, oxidant may be added prior to an oil-water separator to enhance emulsion breaking; then oxidant may be added before a clarifier to oxidize, coagulate and flocculate contaminants; then oxidant may be added as a biocide before the treated water goes into a storage tank, a water hauling truck or a disposal well. A single oxidant solution generator may be outfitted with, for example, three metering pumps for dispensing the oxidant solution from the product buffer tank to each of the three locations for oxidant addition into the water treatment process. Each of the three metering pumps may be controlled independently to dispense the amount required at each location. The product buffer tank level switch feedback loop may control the generator's production rate with the proper feedstock ratios, even if any or all of the three metering pumps are changing in their speed or turning on and off over time.

In some embodiments, the continuous production of a multi-component biocidal complex is achieved. The continuous production of a reactive species formulation on site for industrial scale uses presents several unique challenges specific to each type of reactive species formulation produced. An apparatus that generates a multi-component biocidal complex must provide consistent feedstock feed ratios, chemical reaction stages, variable product output flow rate, minimal residence time of the product, minimal holdup volume of the product and, because the product formulation releases oxygen gas, management of the gas load in the product stream to provide a consistent gas to liquid ratio for consistent dispensing of the liquid product. There should be opportunities for thermal management as needed.

Figure 7:
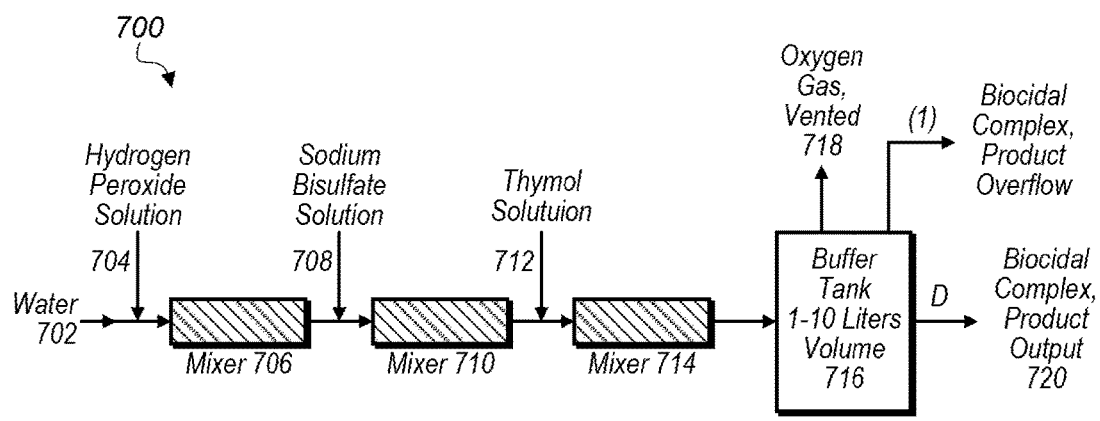
FIG. 7 depicts a schematic representation of a general process shown in the diagram of unit operations for a continuous production of oxidant solution in a multi-component biocidal complex solution generator.

A multi-component biocidal complex (described in U.S. Pat. No. 6,692,757) may include a free radical generator, an acid sulfate or other weak acid and a disinfectant. A catalytic activator for the free radical generator may be optionally employed in the form of an added catalyst, catalytic surface or catalytic impurity in the use environment such as a contaminated water stream. In some embodiments, a multi-component biocidal complex solution generator follows the general process shown in the diagram of unit operations 700 in FIG. 7. The production process is continuous and intermediate conversion products may not be isolated. In this process a softened water or potable water stream 702 may be combined with a peroxide concentrate 704 and blended in Mixer 706. The diluted peroxide solution is combined with a solution of bisulfate 708 and blended in Mixer 710. A solution of thymol 712 or chlorohexidine may be added to the peroxide-bisulfate mixture, optionally containing a catalyst, and is blended and reacted together in Mixer 714 to form the biocidal complex, which may be collected in the product buffer tank 716. While the peroxide-containing biocidal complex solution is in the product buffer tank gases such as oxygen 718 may evolve by the product solution may escape through a gas vent. If the buffer tank is over filled the excess volume may drain from the top of the tank into a catchment through a product overflow line. The gas vent and product overflow line may share the same conduit. The biocidal complex solution 720 may be dispensed from the buffer tank at a rate that is less than or equal to the production rate of biocidal complex solution.

The in-line mixer may be a static mixer, an orifice mixer, a plate-type mixer, a baffled mixer, turbulent flow in a tube or pipe, a chamber outfitted with a rotating impeller, a pump impeller. An in-line mixer may include a combination of mixer types. An in-line mixer may be used as a chemical reaction chamber. An in-line mixer used as a chemical reaction chamber may be designed with a length or volume that extends the residence time of a mixture in a mixing stage such that the reaction time is increased.

The water and three liquid chemical feeds may be metered into the generator process by four metering pumps. Metering pumps may include positive displacement pumps such as tube pumps, hose pumps and diaphragm metering pumps. Metering pumps with the least pulsation or fluctuation in flow rate may be used. Pulsation dampening devices positioned on the metering pump outlets may be used to decrease pressure and flow rate fluctuations.

One example of controlling the oxidant solution production rate may be to set each of the four metering pump speeds to a fixed rate and to switch all of them on and off simultaneously where their run time or duty cycle is controlled by the volume of oxidant solution in the product buffer tank. A feedback loop may include a dual level switch in the product buffer tank, which triggers the pumps to run when a minimum liquid level is reached in the product buffer tank and triggers the pumps to stop when a maximum liquid level is reached in the product buffer tank. The time it takes to draw down the oxidant solution from the maximum to the minimum liquid level determines an approximate residence time of oxidant in the buffer tank. Ideally, this residence time should be minimized to minimize the loss of oxidant concentration before it is dispensed for use.

In an embodiment, peracetate oxidant solutions may exhibit gel breaking abilities for well squeeze to remove "polymer damage". The incomplete removal of gelling polymers after a hydrofractured well completion may result in reduced permeability and well productivity. Breakers may be added to crosslinked polysaccharide gel systems to reduce the viscosity of the gel so that it may be pumped out of the formation after hydrofracturing is conducted. Common breakers such as sodium chlorite and sodium persulfate may be effective at breaking the crosslinker, but not always effective at breaking down the polysaccharide chain structure into smaller, less viscous fragments. As a result, the high molecular weight polysaccharide may not be efficiently removed from the pores in a fractured zone leading to "polymer damage" and reduced permeability. Two chemical degradation pathways may be of importance in the breakdown of polysaccharide-based gels: Hydrolysis of glycoside linkage causing scission of the polysaccharide chain, typically by acid hydrolysis; and Oxidative/Reductive depolymerization (ORD) reactions involving radical pathways in the presence of oxygen species, such as superoxide, as the radical initiator for further breakdown reactions.

Frac on the Fly treatment of make-up water used in the production of hydraulic fracturing fluids as it is delivered to the chemical blender is referred to as "frac on the fly" water treatment. Water is often rapidly disinfected within a short period of time prior to its use to ensure that microbes do not adversely affect the constituents of the hydraulic fracturing fluid or contaminate the well. Typical frac on the fly treatment rates range between about 60 to 100 barrels of water per minute (2500 to 4200 gpm). The active oxidant residual in the treated water is typically required to be very low in gel-based fluids so that it does not interfere with the gel crosslinker chemistry, hydration rate of the gel (e.g., guar gum) or rheology of the gel system. For the sodium peracetate oxidant formulation this residual is preferably less than 6.5 mg/L (less than 5 mg/L measured as peracetic acid). Because the sodium peracetate oxidant formulation has a large ORP response the oxidation-reduction potential (ORP) is a convenient method of monitoring residual oxidant and controlling oxidant dose rate in real time. The oxidant residual may be rapidly measured in a grab sample using a peracetic acid test strip (LaMotte Company).

EXAMPLES

Having now described the invention, the same will be more readily understood through reference to the following example(s), which are provided by way of illustration, and are not intended to be limiting of the present invention.

Example 1: Oil Separation accelerated emulsion breaking, improved oil-water separation and separation of impurities from oil with oxidant. A water sample originating from the Eagle Ford formation in South Texas, USA contained 35 to 40% by volume oily fraction. The water sample was thoroughly mixed and 500 mL dispensed into 1 L beakers to conduct tests using a Phipps and Bird programmable jar tester. The jar tester was programmed for a rapid mix of intermediate shear force at 115 rpm impeller speed for 1.25 minutes, rapid enough to blend the oily and water fractions completely, followed by a low shear impeller speed of 5 rpm for 10 minutes to promote coalescence. All tests were conducted at room temperature, 20-25° C. The 500 mL oil-water samples were dosed with varying amounts of sodium peracetate oxidant solution during the rapid mix from an oxidant solution that was 2.1% wt/vol sodium peracetate (1.6% wt/vol measured as peracetic acid (PAA)). The volume of water relative to the oily layer, the height of emulsified layer within the oily layer and the precipitation of dark solids was compared before and after the mixing program.

500 mL jar samples of the Eagle Ford water typically exhibited three layers with distinct interfaces. The bottom layer was bulk water that appeared pale grey-tan and hazy; the middle layer was a dark brown, emulsified oil layer typically 5-10 mm thick; the top layer was a dark brown-black layer that appeared to be a more dense oil layer. The control sample, no oxidant added, showed a very slow decrease in the thickness of the middle, emulsified layer. Samples treated with the sodium peracetate oxidant solution at 10, 20 and 30 mg/L oxidant (measured as PAA) showed a rapid decrease in the thickness of the middle, emulsified layer to about 2 mm which was replaced by a thicker top, dark brown-black oil layer and a small increase (about 2% to 6%) in bulk water volume. The bulk water layer had a slightly more orange hue after the treatment and dark particles of organic solids had separated from the oily layer and settled to the bottom of the jar test beakers.

Example 2: Oxidant dose concentration determines selectivity for separation of mostly organic/oil materials vs organic and iron sludge formation. A water sample originating from the Piceance basin formation in CO, USA contained a suspended black organic material (very fine particles and a small amount, less than 0.5% vol/vol, of free oil). The water sample was thoroughly mixed and 500 mL dispensed into 1 L beakers to conduct tests using a Phipps and Bird programmable jar tester. The jar tester was programmed for a rapid mix of high shear force at 295 rpm impeller speed for 1.25 minutes, followed by a low shear impeller speed of 25 rpm for 10 minutes to promote coalescence and floc formation. All tests were conducted at room temperature, 20-25° C. The 500 mL water samples were dosed with varying amounts of sodium peracetate oxidant solution during the rapid mix from an oxidant solution that was 2.1% wt/vol sodium peracetate (1.6% wt/vol measured as PAA). Also during the rapid mix the jar samples were dosed with 0.5 to 1 mg/L of an anionic polymer dispersion as a coalescence and floc aid.

The control sample, no oxidant added, showed very little separation of dark materials over a period of 1 hour. Samples treated with the sodium peracetate oxidant solution at 60-80 mg/L oxidant (measured as PAA) showed rapid formation of coalescing, dendritic floc particles. The small amount of anionic polymer increased the rate of separation of dark materials from the water to leave a clear, colorless supernatant. Within 5 minutes after mixing ceased the dark materials floated to the top of the water leaving a clear, colorless water fraction.

At oxidant doses of 100 mg/L oxidant (measured as PAA) and greater, also with anionic polymer added, the black suspended material turned brown and formed a brown-tan floc that rapidly settled to the bottom of the clear, colorless water within about 10 minutes after mixing ceased. The difference in density of the floc can be explained by the formation of more iron oxide solids removed from the water fraction at higher oxidant doses. The untreated water contained 35 mg/L total iron while 80 mg/L oxidant treated water contained about 18 mg/L total iron and the 100 mg/L oxidant treated water contained about 8 mg/L total iron. Iron removed from the water can act as a floc ballast in this example. The removal of suspended and oily hydrocarbons can be achieved at lower oxidant dose concentration, which reduces the amount of waste sludge containing iron and increases the quality of recovered hydrocarbons.

Example 3: Removal of impurities from oil by thorough mixing with aqueous phase and partial/temporary re-emulsification plus oxidant. A water sample originating from the Denver-Julesburg basin formation in CO, USA contained 20 to 25% by volume oily fraction. The water sample was thoroughly mixed and 500 mL dispensed into 1 L beakers to conduct tests using a Phipps and Bird programmable jar tester. The jar tester was programmed for a rapid mix of high shear force at 295 rpm impeller speed for 1.25 minutes, followed by a low shear impeller speed of 25 rpm for 10 minutes to promote coalescence and floc formation. All tests were conducted at room temperature, 20-25° C. The 500 mL water samples were dosed with varying amounts of sodium peracetate oxidant solution during the rapid mix from an oxidant solution that was 2.1% wt/vol sodium peracetate (1.6% wt/vol measured as peracetic acid (PAA)).

The control sample, no oxidant added, showed three distinct layers, dark brown-black oil on top, hazy grey-tan water on the bottom and a small emulsified layer in between, about 2-3 mm thick. Samples treated with the sodium peracetate oxidant solution at 40 mg/L oxidant (measured as PAA) showed formation of a thicker emulsified middle layer which was about 10 mm thick when mixing ceased. The water layer was more yellow-tan. Five minutes after mixing ceased the emulsified middle layer was about 3-4 mm thick. At 25 minutes after mixing ceased the emulsified middle layer was just an interface about 2 mm thick and dark solids had settled to the bottom of the jar. In this example the removal of dark solid impurities from the oil layer was achieved by an oxidant treatment during which a short-lived re-emulsification allowed the oxidant to effectively contact the oil phase and allow the impurities to drop out of the emulsified oil-water interface as it broke. The untreated water contained 57 mg/L dissolved iron and the 40 mg/L oxidant treated water contained about 47 mg/L dissolved iron showing that little iron had been precipitated during the oil separation treatment.

Example 4: Solution Preparation. The following procedures were used to produce oxidant and polymer solutions used in laboratory tests, sodium peracetate oxidant solution preparation (used in lab tests, jar tests):

Sodium Peracetate Preparation: A 3.0% wt/vol solution of hydrogen peroxide (topical solution) was diluted with 8.30 mL of distilled water in a 50 mL glass beaker containing a Teflon-coated magnetic stir bar. This solution was stirred while 3.80 mL of 1.0 mol/L sodium hydroxide solution was added to produce the alkaline hydrogen peroxide solution with a 1:1 molar ratio of hydrogen peroxide to sodium hydroxide. To this solution was added 0.49 mL of triacetin (99%) (a 2.1:1 molar ratio of acetyl donor groups to hydrogen peroxide) and the mixture was stirred rapidly for 1-2 minutes. The initial concentration of sodium peracetate in this 16.6 mL solution was 2.2% wt/vol (1.7% wt/vol measured as peracetic acid) and had an initial pH of about 10.1-10.7. This preparation was proportionately scaled up or down in volume depending on the amount of oxidant needed.

Measurement of Sodium Peracetate Concentration: Measurement of sodium peracetate concentration is conducted by using a peroxide iodometric titration procedure from HACH. A known, volumetric aliquot of the peracetate-containing solution is diluted with a volume of distilled water where the total volume is convenient for titration between about 5 and 25 mL in a small glass beaker or flask. The diluted peracetate solution is stirred and 1 mL of ammonium molybdate reagent (HACH reagent 1933-32) is added. Sulfuric acid in the reagent converts the peracetate to peracetic acid. The contents of one Sulfite 1 Reagent packet (HACH reagent 2203-99) is added to the prepared solution and stirred for 5 minutes. The purple color that develops is titrated to a colorless endpoint with a standard sodium thiosulfate solution (for example, 0.0250 N sodium thiosulfate solution). The peroxide concentration is calculated based on the volume of the aliquot of peracetate-containing solution, the volume and concentration of sodium thiosulfate solution, two electron equivalents consumed for each molecule of peroxide and the molecular weight of the peroxide being measured.

Chlorine dioxide stock solution preparation: One AQUA-Tab 20 G chlorine dioxide tablet (Beckart Environmental, Inc.) was dissolved in 32 oz (946 mL) of distilled water in a closed polyethylene container according to the product instructions. The yellow solution was allowed to sit for at least 1 hour before use. The chlorine dioxide concentration was measured before use using the HACH DPD method no. 10126 after diluting 0.330 mL of the prepared chlorine dioxide stock solution with distilled water to 200 mL in a volumetric flask. The initial chlorine dioxide concentration of the stock solution was measured to be 2800 mg/L. The concentration decreased slowly over time at room temperature, e.g., 6.4% decrease in 7 days.

Polymer makedown procedure: A known volume of liquid polymer dispersion, anionic Polymer B40 (Beckart Environmental, Inc.), was diluted 250-fold with distilled water and mixed according to the product instructions to make a 0.4% polymer dispersion concentration, which was then dispensed into water samples in laboratory testing.

Example 5: Sequential dosing of peracetate oxidant solution. A mixed produced water sample that originated from the Piceance basin formation in CO, USA contained suspended and dissolved solids, bacteria and up to about 1.5% salinity. This sample was used to test the difference between dosing multiple quantities of oxidant and dosing a single quantity equivalent to the sum of multiple doses. The test procedure was as follows: 50 or 100 mL of thoroughly mixed produced water sample was dispensed into a 250 mL beaker with magnetic stir bar. A high sodium pH electrode and an ORP electrode were suspended in the produced water for continuous measurement at room temperature. Oxidant solution was added to the produced water while stirring at a moderate rate. ATP concentration measurements were made periodically to monitor microbial activity.

Figure 8:
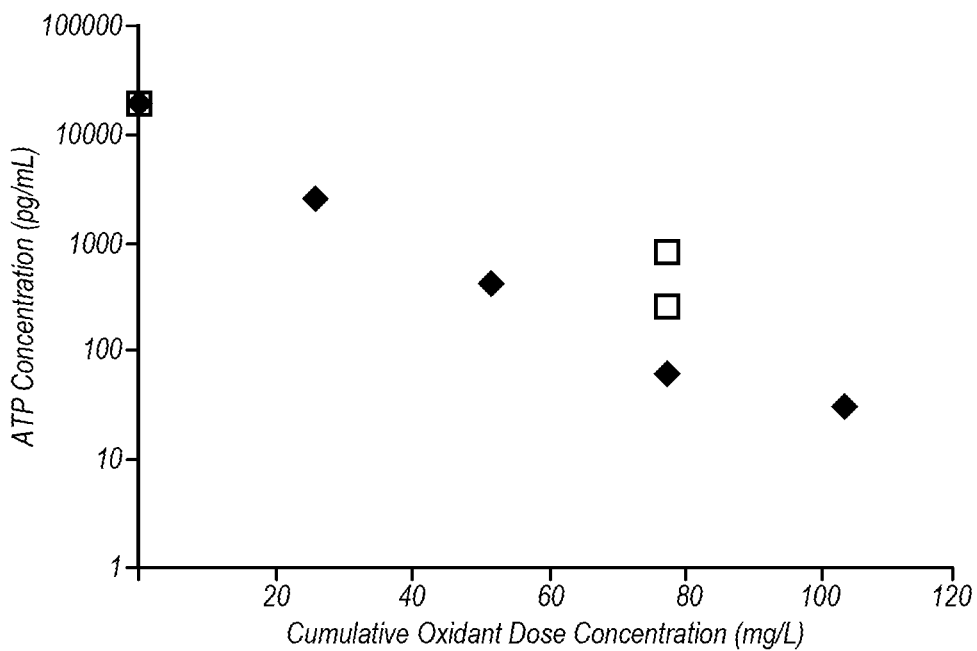
FIG. 8 depicts a graphical representation of a reduction of ATP concentration after each sodium peracetate oxidant dose. Diamonds are sequential additions of oxidant and ATP measured at 15 min contact time after each 26 mg/L dose; squares are a single oxidant dose equal to 78 mg/L and ATP measured at 15 and 30 minute contact times.
Figure 9:
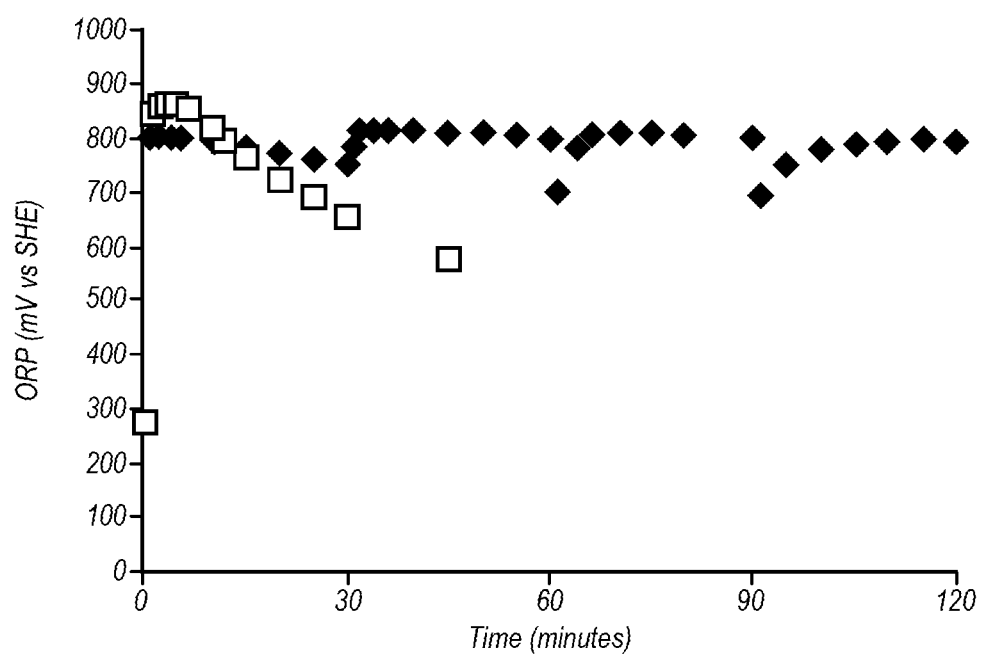
FIG. 9 depicts a graphical representation of a ORP of produced water treated with sodium peracetate oxidant. Diamonds are the response to sequential additions of oxidant at 0, 30, 60 and 90 minutes; squares are the response to a single oxidant dose.

For the sequential dosing experiment each sodium peracetate oxidant dose concentration was 26 mg/L (20 mg/L measured as PAA). The first oxidant dose was added and the ORP rapidly increased to more than 800 mV vs SHE. The ATP concentration was measured at 15 minutes contact time after each dose of oxidant was added. Each subsequent quantity of oxidant was dosed into the water after 30 minutes of contact time with the previous oxidant dose. A total of four oxidant doses were made and the results are provided in FIG. 8 and FIG. 9. The ATP concentration results in FIG. 8 show a logarithmic decrease over the first three oxidant additions and less benefit from the fourth addition. The ORP response in FIG. 9 shows a small decrease after each of the first two additions. Upon the third and fourth additions the ORP spiked down and then recovered to a more sustained level. The downward spike in ORP is thought to be due to the fresh oxidant reacting with the reactive species responsible for the activated, elevated ORP. The ORP recovers as more reactive, high ORP species are produced by oxidant activation in the contaminated water.

For the single dose experiment the sodium peracetate oxidant dose concentration was 78 mg/L (60 mg/L measured as PAA). The first oxidant dose was added and the ORP rapidly increased to a maximum of 870 mV vs SHE then decreased continuously over time as shown in FIG. 9. The ATP concentration was measured at 15 and 30 minutes contact time after the oxidant was added. The ATP concentration in the produced water with a single dose was significantly greater than the ATP concentration in the water with sequential doses with the same cumulative dose concentration. The ORP of the sequentially-dosed water was sustained at a high value compared to the single dose treated water where the ORP decreased to below 600 mV vs SHE in less than 60 minutes, which indicates that there is a higher oxidant demand at higher oxidant dose.

Example 6: Use of adsorbent, ballasting materials (clay and iron oxide) to enable water softening and iron reduction in highly impaired water containing high levels of antiscalants and iron stabilizers. An early flowback water sample originating from the Denver-Julesburg basin formation in CO, USA contained suspended and dissolved solids, free oil, up to about 1.1% polysaccharide content, crosslinker, antiscalant(s), iron stabilizer(s), bacteria and up to about 2.5% salinity. The water appeared black and opaque, had a fuel/hydrocarbon odor and produced foam when vigorously shaken. The early flowback water sample was thoroughly mixed before dispensing. Jar tests were conducted using a Phipps and Bird programmable jar tester. The jar tester was programmed for a rapid mix of high shear force at 295 rpm impeller speed and slow mix speed of 25 rpm to promote floc formation. All tests were conducted at room temperature, 18-21° C.

A 500 mL portion of the early flowback water was put in a 1 L beaker for Treatment 1 listed in 4-A. The jar sample was rapid mixed for 1.25 minutes while adding dose concentrations of 168 mg/L sodium peracetate oxidant (130 mg/L measured as PAA) and 1 mg/L of Polymer B-40 dispersion as a floc aid.

The water's color rapidly turned orange and the ORP increased to about 700 mV vs SHE. During the first 5 to 10 minutes of slow mixing there was some floc formation. After 20 minutes stirring was ceased and the flocculated solids were allowed to settle, however the water remained hazy orange. At 60 minutes contact time after the oxidant was added the ATP concentration was measured and 5-fold serial dilution bioassays were prepared for acid producing and sulfate reducing bacteria. The ATP concentration was reduced by about 93% from the untreated water concentration and the bioassay results indicated at least 4 log reductions in acid producing and sulfate reducing bacteria relative to the untreated water's ATP concentration (approximately $1.8 \times 10^6$ microbial equivalents per mL).

Several attempts to remove calcium and iron from the oxidant-treated flowback water in Treatment 1 using chemical softening approaches were unsuccessful. Addition of lime (0.25 g) several hours after the oxidant was added significantly increased the calcium concentration while magnesium was not decreased, even at a pH of 10.1. Subsequent addition of soda ash (4.4 g) did not precipitate calcium, but it did raise the solution pH to 11.1 causing precipitation and removal of magnesium. The iron concentration was not significantly affected. The antiscalants and iron stabilizers in this early flowback water are very effective at holding calcium, magnesium and iron in solution. The fine, suspended solids could not be fully settled by the use of a polymer floc aid.

The use of a bentonite clay blend, PolyClay 1022 (Beckart Environmental) or iron oxide powder (produced by oxidation of ferrous sulfate with sodium peracetate oxidant solution) were found to be effective as adsorbents and ballast for reducing the effect of antiscalants and iron stabilizers in the early flowback water. First, 1 L of early flowback water sample was placed in a sealed bottle and heated to 50° C. for 2 hours in a water bath to simulate water sent through a heat treater. Two 500 mL portions of the heated water were put into two separate 1 L beakers for treatment tests, which incorporated clay in Treatment 2 and iron oxide in Treatment 3 listed in Table 1. Each jar was rapid mixed for 1.25 minutes while 0.50 g of clay was added to Treatment 2 and 0.74 g of iron oxide was added to Treatment 3. Both Treatments 2 and 3 were slow mixed for 10 minutes and then allowed to settle for 10 and 30 minutes, respectively. The water fractions of both treatments, which turned from black to hazy, pale orange-gray in appearance, were decanted off of the sediment layers into clean 1 L beakers. The clay sediment appeared to have a gel-like material combined with it. The iron oxide sediment appeared to be fine particles without a visible gel component. Both water samples were then rapid mixed for 1.25 minutes while adding dose concentrations of 168 mg/L sodium peracetate oxidant (130 mg/L measured as PAA) and 2 mg/L of polymer B-40 dispersion as a floc aid to each. There was an immediate color change to hazy orange for both treatments. The samples were slow mixed for 15 minutes and then allowed to settle. Only Treatment 2 with clay formed a fine floc and the supernatant partly clarified to a semi-transparent orange color. Treatment 3 remained hazy orange in color. Total iron analyses were made on the water fractions, unfiltered, which showed about a 28% reduction in iron concentration. Both treatments were then rapid mixed while 0.1 g of soda ash was added to each and then allowed to react and settle for 2 hours during which a pale, fine solid settled out of the treated waters. The calcium concentration was reduced by about 97% at a pH of 8.1 for both treatments.

TABLE 1

| Parameter | Untreated | Treatment 1 | Treatment 2 | Treatment 3 |
|---|---|---|---|---|
| pH | 6.9 | 11.1 | 8.1 | 8.1 |
| ORP (mV vs SHE), maximum | 83 | 701 | — | — |
| Alkalinity (mg/L as CaCO3) | 1056 | — | — | — |
| Calcium (mg/L as CaCO3) | 16,000 | 21,000 | 530 | 510 |
| Magnesium (mg/L as CaCO3) | 220 | 0 (BDL) | 220 | 240 |
| Chloride (mg/L) | 15,400 | — | — | — |
| Sodium (mg/L) | 9450 | — | — | — |
| Sulfate (mg/L) | 0 (BDL) | — | — | — |
| Aluminum (mg/L, total) | 0.60 | — | — | — |
| Iron, Total (mg/L) | 51 | 52 | 37 | 36 |
| Iron, Dissolved | 47 | 41 | — | — |
| TSS (mg/L) | 331 | — | — | — |
| ATP (pg/ml), at 60 min CT | 1850 | 121 | — | — |
| ATP reduction at | — | 93% | — | — |
| APB (cells/mL and log reduction) | >>10,000 | 4-5 log | — | — |
| SRB (cells/mL and log reduction) | >>10,000 | 4 log | — | — |

CT = contact time; BDL = below detection limit

Example 7: Example of flowback water treatment process, which includes organic contaminant removal with activated carbon or ferric chloride. An early flowback water sample originating from the Denver-Julesburg basin formation in CO, USA contained suspended and dissolved solids, free oil, about 0.9% polysaccharide content, crosslinker, antiscalant(s), iron stabilizer(s), bacteria and up to about 2.5% salinity. The water appeared black and opaque, had a fuel/hydrocarbon odor and produced foam when vigorously shaken. Total carbohydrate was measured using the anthrone method with sulfuric acid digestion, which was modified to minimize interferences from the contaminated water matrix. The early flowback water sample was thoroughly mixed before dispensing. Jar tests were conducted using a Phipps and Bird programmable jar tester. The jar tester was programmed for a rapid mix of high shear force at 295 rpm impeller speed and slow mix speed of 25 rpm to promote floc formation. All tests were conducted at room temperature, 18-21° C.

Treatment 1 in Table 2 was conducted on 800 mL of flowback water. The water was rapid mixed while 0.80 g of powdered activated charcoal (lab grade, Colorado Scientific) was added to the water. After rapid mixing for about 30 seconds a dose concentration of 168 mg/L sodium peracetate oxidant (130 mg/L measured as PAA) was added, followed by a slow mix period of 5 minutes. The ORP rapidly increased to about 770 mV vs SHE. A rapid mix was restarted and a dose concentration of 2 mg/L of Polymer B-40 dispersion was added. The activated charcoal and impurities rapidly flocculated and the mixture was slow mixed for 5 minutes during which a black mass of material rapidly settled to the bottom of the jar. The rapidly flocculating mixture was slow mixed for 5 minutes during which a black mass of material collected on the bottom of the jar. Mixing was stopped and solids were allowed to settle for about 5 minutes. The clarified water appeared very pale yellow and slightly hazy. Total iron, calcium and magnesium were slightly reduced in concentration while TSS was significantly reduced. Measurement of the gel concentration in the treated sample had a large colorimetric interference. The mass of gel removed was then estimated gravimetrically. The black residue was collected and dried leaving a mass of 2.2 g of material. Subtracting the mass of activated charcoal added to the water from the dry residue mass equates to about 1500 mg/L of gel removed, which is an unexpectedly large amount removed. This activated carbon to gel mass ratio is 1:1.5. Flowback water blended with other water types at a collection or disposal facility may contain up to several hundred mg/L of gel, which is expected to be effectively removed by this treatment method.

Treatment 2 in Table 2 was conducted on 800 mL of flowback water. The water was rapid mixed while 0.80 g of powdered activated charcoal was added to the water. After a 1 minute rapid mix contact time a dose concentration of 168 mg/L sodium peracetate oxidant (130 mg/L measured as PAA) was added, followed by a 30 second rapid mix contact time. Then 0.16 g of sodium carbonate was added and rapid mixed for another 20 seconds. At this point the pH was 8.3 and the ORP was 709 mV vs SHE. The water was then slow mixed and the pH was adjusted to 9.5 with sodium hydroxide. After 20 minutes the water was rapid mixed for 45 seconds while a dose concentration of 2 mg/L of Polymer B-40 dispersion was added. The water was slow mixed for 5 minutes and then stopped to allow flocculated solids to settle for at least 10 minutes. The clarified water appeared paler yellow than Treatment 1 and slightly hazy and had a pH of 9.3. Total iron and calcium were more reduced in concentration and TSS was significantly reduced. Dissolved iron measured in a 0.45 micron-filtered sample of the treated water was 2.2 mg/L while total iron was 15 mg/L indicating that suspended iron was contributing to TSS and visible haziness and color. The gel concentration, measured as total carbohydrate, was reduced by 2270 mg/L, which is an unexpectedly large amount of gel removed. This is an activated carbon to gel mass ratio of 1:2.27.

Treatment 3 in Table 2 was conducted on 800 mL of flowback water. The water was rapid mixed while 0.232 g of ferric chloride (10 mg/L iron dose concentration) was added to the water. After a 1 minute rapid mix contact time a dose concentration of 168 mg/L sodium peracetate oxidant (130 mg/L measured as PAA) was added, followed by a 30 second rapid mix contact time. Then 0.16 g of sodium carbonate was added and rapid mixed for another 20 seconds. At this point the pH was 6.6, the ORP was 782 mV vs SHE, and iron oxide floc had formed. The water was then slow mixed and the pH was adjusted to 9.5 with sodium hydroxide and the floc developed further. After 20 minutes the water was rapid mixed for 45 seconds while a dose concentration of 2 mg/L of Polymer B-40 dispersion was added. The water was slow mixed for 5 minutes and then stopped to allow flocculated solids to settle for at least 10 minutes. The clarified water appeared nearly colorless and clear and had a pH of 9.0. Total iron and calcium were more reduced in concentration and TSS was virtually removed. The gel concentration, measured as total carbohydrate without colorimetric interference, was reduced by 2650 mg/L, which is an unexpectedly large amount of gel removed. The iron (from ferric chloride) to gel mass ratio is 1:265.

The 33 mg/L of iron removed from the flowback water could also be contributing to the iron-enhanced removal of gel, which would bring the total iron to gel mass ratio closer to about 1:64.

TABLE 2

| Parameter | Untreated | Treatment 1 | Treatment 2 | Treatment 3 |
|---|---|---|---|---|
| pH | 7.1 | 7.3 | 9.3 | 9.0 |
| ORP (mV vs SHE), maximum | 160 | 771 | 709 | 782 |
| Alkalinity (mg/L as CaCO3) | 972 | — | — | — |
| Calcium (mg/L as CaCO3) | 810 | 770 | 350 | 310 |
| Magnesium (mg/L as CaCO3) | 160 | 130 | 150 | 140 |
| Chloride (mg/L) | 115,400 | — | — | — |
| Sulfate (mg/L) | 0 (BDL) | — | — | — |
| Iron, Total (mg/L) | 36 | 24 | 15 | 2.8 |
| Iron, Dissolved | | — | 2.2 | 2.0 |
| TSS (mg/L) | 330 | 57 | 46 | 2 |
| Total 1 Carbohydrate | 9160 | 7660 | 6890 | 6510 |

Example 8: Half Life and Attenuation of Oxidant Solution: The minimum attenuation rate or degradation rate of the sodium peracetate oxidant solution was measured experimentally in clean water conditions. A sodium peracetate oxidant solution containing an initial concentration of 7.5% (wt/vol) sodium peracetate with an initial pH of about 10.1 was prepared by dissolving 0.34 g of sodium hydroxide (98%) in 10.0 mL of 2.85% wt/vol hydrogen peroxide (topical solution) in a 50 mL beaker. Then 1.22 g of triacetin (99%) was combined and the mixture rapidly stirred for 1-2 minutes at room temperature. The sodium peracetate oxidant solution was placed in a clean glass container and its temperature maintained at 25±2° C. using a heated water bath.

The sodium peracetate concentration was measured over time using the method described in Example 4. Concentrations were accurate to about ±2.4% of the values measured. The pH was measured using a high sodium electrode (Oakton model 35805-05) with three point calibration and automatic temperature correction.

Figure 10:
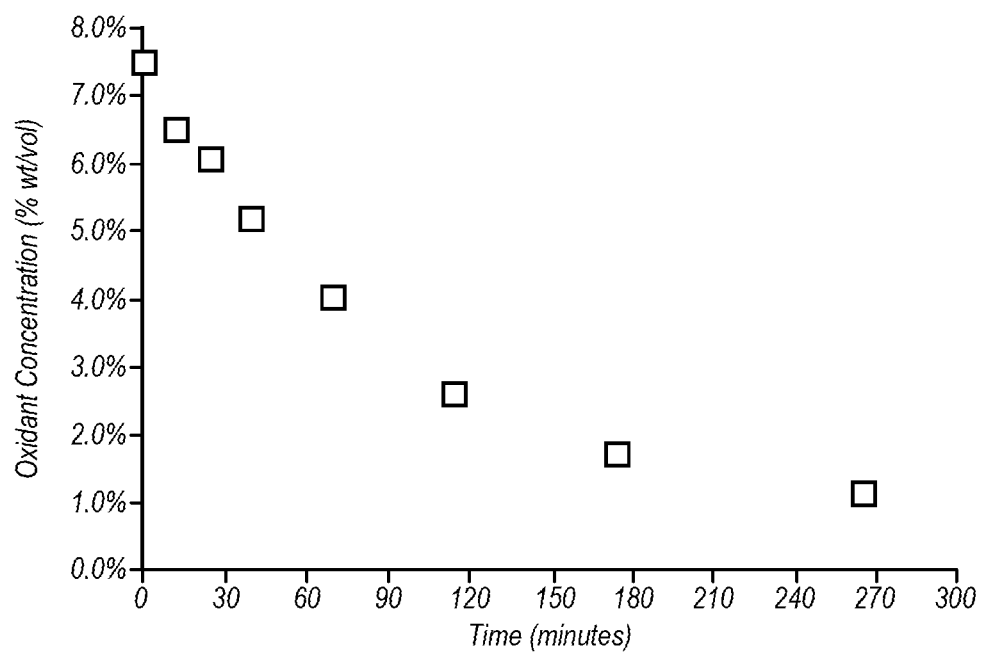
FIG. 10 depicts a graphical representation of an attenuation of sodium peracetate concentration in clean water conditions.

The peracid concentration decreased over time as shown in FIG. 10. Based on these results the 7.5% sodium peracetate oxidant solution has a half-life of about 80-85 minutes at 25° C. The initial pH of the solution was 10.1 and the final pH was 7.3 (at 265 min). Within about 6 days' time the concentration of oxidant is typically decreased to less than 5 mg/L and the residual solution has a pH in the range of pH 6 to 7.

When the oxidant solution is in an environment including contaminants, soil, silt, metals, catalysts, organic materials, microbes, biofilms, sunlight, ultraviolet radiation, elevated temperature and other reactive conditions the attenuation degradation rates can be accelerated significantly.

Example 9: Hydrogen Peroxide Residual Concentration and interference. A sodium peracetate oxidant solution was produced according to the procedure in Example 4 and diluted to 2800 mg/L (28.5 mmol/L) with either distilled water, for clean water conditions, or tap water containing about 0.18 mg/L copper, which served as an activation catalyst. Some samples were spiked with 30 or 60 mg/L (0.88 or 1.76 mmol/L, respectively) hydrogen peroxide from a 1000 mg/L stock solution. During peracetate solution preparation the pH was adjusted to pH 9 with sodium bisulfate solution and maintained at pH 9.00±0.03 throughout the experiments to eliminate variable pH effects on the solutions' ORP response. The temperature of the samples was maintained at 25±2° C. with a heated water bath. The ORP response was monitored over time to observe the impact of adding low concentrations of hydrogen peroxide.

The pH was measured using a high sodium electrode (Oakton model 35805-05) with three point calibration and automatic temperature correction. The ORP (oxidative-reductive potential) of solutions was measured using an Oakton model 35805-15 ORP probe calibrated to the standard hydrogen electrode (SHE) using Thermo/Orion ORP standard 967901.

Figure 11:
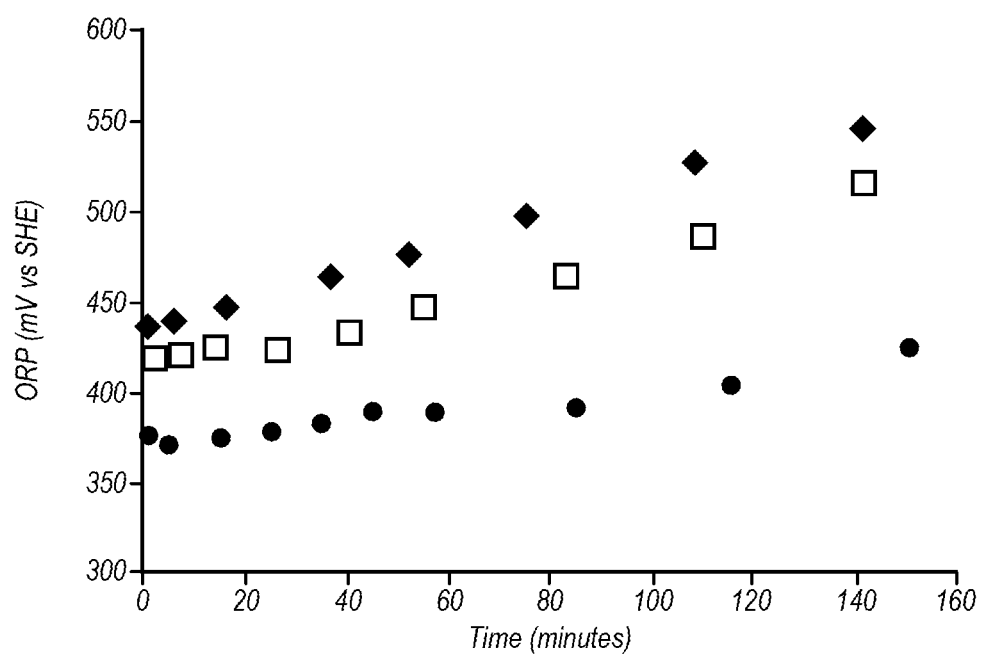
FIG. 11 depicts a graphical representation of a ORP response monitored over time to observe the impact of adding low concentrations of hydrogen peroxide using three different solutions. All measurements at 2800 mg/L sodium peracetate initial concentration and pH adjusted to and maintained at pH 9.00+/−0.03 with NaHSO4. Solid Circles represent oxidant solution diluted with distilled water.

The results in FIG. 11 show the ORP response of three solutions. The first sample is a 2800 mg/L sodium peracetate oxidant solution prepared with distilled water (solid circles). There is minimal "activation" and minimal ORP increase in clean water conditions. A second sample is a 2800 mg/L sodium peracetate oxidant solution prepared with tap water (solid diamonds). The second sample shows an activated and increasing ORP response that increases continuously from time zero. A third sample is a 2800 mg/L sodium peracetate oxidant solution prepared with tap water and spiked with 60 mg/L hydrogen peroxide (open squares). The third sample shows a lower activated ORP that increases after about a 25 minute induction period. A fourth sample (data not shown) prepared in the same manner as the third, but spiked with 30 mg/L hydrogen peroxide has an ORP response that is between the second and third samples and has virtually no induction period before the ORP increases.

Based on these results, hydrogen peroxide is interfering with reactive species formation at a 60 mg/L hydrogen peroxide residual concentration, which corresponds to 2.1 wt % of hydrogen peroxide relative to sodium peracetate or a peracetate to hydrogen peroxide molar ratio of 16:1. The induction period before ORP increases in the third sample suggests that a low hydrogen peroxide content can be consumed and eliminated by parasitic reactions with peracetate anion or other reactive species. Hydrogen peroxide reacts directly with peracetate anion producing byproducts including triplet oxygen, sodium acetate and water. This reaction can remove residual hydrogen peroxide most rapidly when the sodium peracetate oxidant solution pH is in the range of about pH 8.3 to about pH 11.6.

A similar induction period can be observed in bleaching curves using sodium peracetate oxidant to bleach solutions of methylene blue dye in clean water conditions. That is, minimal bleaching activity for several minutes followed by rapid bleaching.

There is a small, negative effect on the rate of ORP increase when 30 mg/L hydrogen peroxide is present in the sodium peracetate oxidant solution prepared with tap water, which corresponds to 1.05 wt % of hydrogen peroxide relative to sodium peracetate or a peracetate to hydrogen peroxide molar ratio of 32:1. The impact is relatively small having little or no induction period before activation.

Based on the above results the preferred concentration of residual hydrogen peroxide in the sodium peracetate oxidant solutions is less than about 2 wt % relative to sodium peracetate or a peracetate to hydrogen peroxide molar ratio of 16:1. More preferably the concentration of residual hydrogen peroxide in the sodium peracetate oxidant solutions is less than about 1 wt % relative to sodium peracetate or a peracetate to hydrogen peroxide molar ratio of 32:1. Even more preferably the concentration of residual hydrogen peroxide in the sodium peracetate oxidant solutions is less than about 0.1 wt % relative to sodium peracetate or a peracetate to hydrogen peroxide molar ratio of 320:1

Example 10: Hydrogen Peroxide Interference and/or the need for peracetate. ORP monitoring test were conducted in this example using a mixed produced water sample that originated from the Piceance basin formation in CO, USA contained suspended and dissolved solids, bacteria and up to about 1.5% salinity. The untreated water had a pH of 7.49 and ORP of 67 mV vs SHE. Tests were conducted on 50 mL produced water volumes at 22° C. and a pH maintained at pH7.00±0.03 using concentrated sodium hydroxide and sodium bisulfate solutions. The pH was measured using a high sodium electrode (Oakton model 35805-05) with three point calibration and automatic temperature correction. The ORP (oxidative-reductive potential) of solutions was measured using an Oakton model 35805-15 ORP probe calibrated to the standard hydrogen electrode (SHE) using Thermo/Orion ORP standard 967901. Sodium peracetate oxidant solution was produced according to the procedure in Example 4. The appropriate amount of oxidant solution was dosed into produced water samples to give 100 and 500 mg/L initial dose concentrations.

The "merchant" peracetic acid solution was produced by making a sodium peracetate solution as described in Example 4 and acidifying it with 3% acetic acid to pH 4.5 to convert the sodium peracetate to peracetic acid, which stabilizes it to decomposition. Then a portion of 1% hydrogen peroxide solution was added to simulate an equilibrium PAA composition in which the peracetic acid to hydrogen peroxide molar ratio is 1:1. The final composition contained 7.8 g/L peracetic acid, 3.5 g/L hydrogen peroxide, about 8.3 g/L acetic acid and sodium acetate. Making PAA by this acetyl donor method also demonstrates that its performance is very different than the reactive species precursor solution produced by the present method.

Figure 12:
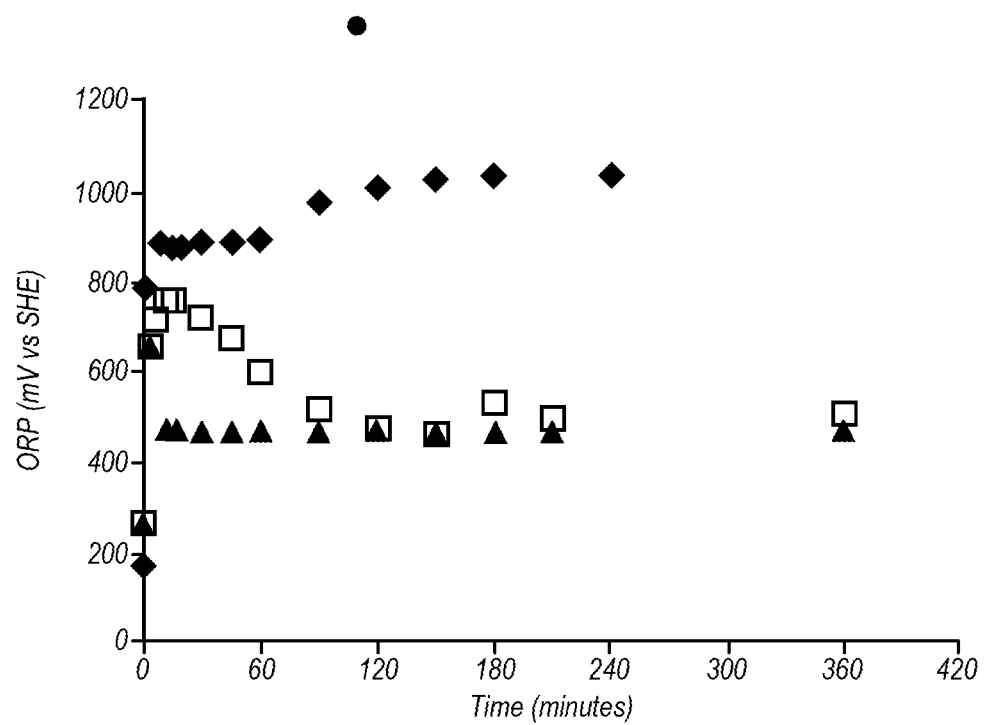
FIG. 12 depicts a graphical representation of a ORP monitoring test using a mixed produced water sample that originated from the Piceance basin formation in CO, USA using different initial doses of sodium peracetate oxidant solution. All measurements conducted at pH 7.0 and 22 C. Solid Diamonds represent 6.57 mmol/L sodium peracetate oxidant. Open Squares represent 1.31 mmol/L sodium peracetate oxidant. Solid Triangles represent 6.57 mmol/L peracetic acid containing 6.57 mmol/L hydrogen peroxide.

ORP monitoring results are shown in FIG. 12. The first treatment with 100 mg/L initial dose of sodium peracetate oxidant solution (open squares) showed a rapid increase in ORP to nearly 800 mV vs SHE followed by a decline to about 470 mV after 120 minutes. At this time the residual sodium peracetate oxidant is virtually consumed.

The second treatment with 500 mg/L initial dose of sodium peracetate oxidant solution (solid diamonds) showed a rapid increase in ORP to about 890 mV vs SHE, which later increased to about 1040 mV vs SHE and remained at that level for over 19 hours (data not shown) before slowly decreasing over the subsequent several hours. The oxidant was dosed at a level that provided a residual to maintain a high ORP for an extended period of time. A high ORP is desirable for maintaining biostatic conditions.

The third treatment with 500 mg/L initial dose of peracetic acid and 224 mg/L hydrogen peroxide (solid triangles), the "merchant" peracetic acid solution, showed a very brief, initial spike in ORP, which then remained at about 470 mV vs SHE throughout the test period. Even though the total oxidant dose in this treatment was twice the molar concentration of the second treatment, the ORP was insensitive and indicated that reactive species formation or activity was severely inhibited in the presence of hydrogen peroxide and the absence of sodium peracetate.

The dramatic increase in ORP for impaired water treated with the sodium peracetate oxidant solutions provides a convenient measure and feedback for monitoring and controlling oxidant dose concentration or dose rate in a treatment process.

Example 11: Continuous production of sodium peracetate oxidant solution. An example of generating sodium peracetate oxidant solution continuously includes the following steps (e.g., FIG. 4): Potable water passes through a 25 micron particle filter, through a water softening media filter and fed into a pipe at a rate of 1.30 L/min. A 20% wt/wt solution of sodium hydroxide is fed into the water stream at a rate of 0.18 L/min through a first tee fitting in the pipe and the mixture flows through a first in-line mixer. A 15% wt/wt hydrogen peroxide solution is fed into the diluted sodium hydroxide stream at a rate of 0.24 L/min through a second tee fitting in the pipe and the mixture flows through a second in-line mixer. Triacetin (99%) is fed into the alkaline hydrogen peroxide stream at a rate of 0.13 L/min through a third tee fitting in the pipe and the mixture flows through a third in-line mixer. The output solution composition then enters the buffer tank where it has a residence time of less than about 5 minutes and contains about 5.4% wt/vol sodium peracetate (4.2% wt/vol measured as peracetic acid), has a pH in the range from about pH 10.4 to about pH 10.8, a peracetate anion to peracetic acid molar ratio of about 150:1 to 300:1, a hydrogen peroxide concentration of less than about 0.05% and an ORP of about 450 to 470 mV vs SHE.

Example 12; Continuous production of a biocide composition comprising hypochlorite and hydrogen peroxide combined in a 10:1 mass ratio or greater. An example of generating a biocide composition comprising hypochlorite and hydrogen peroxide continuously includes the following steps (e.g., FIG. 5): Potable water passes through a 25 micron particle filter, through a water softening media filter and fed into a pipe at a rate of 1.67 L/min. A 12.5% wt/vol solution of sodium hypochlorite (at about pH 13) is fed into the water stream at a rate of 0.33 L/min through a first tee fitting in the pipe and the mixture flows through a first in-line mixer. A 15% wt/wt hydrogen peroxide solution is fed into the diluted sodium hypochlorite stream at a rate of 0.027 L/min through a second tee fitting in the pipe and the mixture flows through a second in-line mixer. Only one addition of hydrogen peroxide is used in this example so the third tee and in-line mixer is not employed. The biocide composition then enters the buffer tank where it has a residence time of less than about 5 minutes, has a pH in the range from about pH 11.6 to about pH 11.9 and an ORP of about 600 mV vs SHE.

After the biocide composition is made the pH of the solution decreases and the ORP increases over time. When the pH of the biocide composition is held constant by the addition of an acid, such as sodium bisulfate, the ORP is observed to increase over time. The ORP of only the diluted sodium hypochlorite at pH 10.00±0.02 and 25±2° C. is constant at about 914 mV vs SHE while the ORP of the biocide composition at pH 10.00±0.02 increases over time to about 940 mV vs SHE within 160 minutes after producing it. The evolution of oxygen gas during the production of the biocide composition and the dynamic pH and ORP of the biocide composition over time are indicators of dynamic chemical processes occurring in the biocide composition involving the production of reactive species at the expense of the parent oxidants, hypochlorite and hydrogen peroxide.

Example 13, Continuous production of sodium peracetate-superoxide oxidant solution. An example of generating sodium peracetate-sodium superoxide oxidant solution continuously includes the following steps (e.g., FIG. 6): An alkaline solution of 0.31% wt/vol sodium peroxide and 0.34% wt/vol sodium superoxide with a sodium peroxide to sodium superoxide molar ratio 1:1.56, a pH of 13.2 and ORP of 60 mV vs SHE is fed into a pipe at a rate of 0.26 L/min. Optionally, a hydrogen peroxide solution is fed into the sodium peroxide+sodium superoxide solution to adjust the peroxide to superoxide ratio; and this mixture flows through a first in-line mixer. A 10% wt/vol sulfuric acid solution is fed into the sodium peroxide and sodium superoxide stream through a second tee fitting in the pipe at a rate of 0.010 L/min to produce a pH 12.7 solution. Triacetin (99%) is fed into the sodium peroxide and sodium superoxide stream at a rate of 0.0033 L/min through a third tee fitting in the pipe and the mixture flows through a third in-line mixer. The output solution composition then enters the buffer tank where it has a residence time of less than about 5 minutes and contains about 0.89% wt/vol sodium peracetate (0.69% wt/vol measured as peracetic acid), has a pH in the range from about pH 10.5 to about pH 11.5, a peracetate to superoxide molar ratio of approximately 1:1.5 and an ORP of about 260 mV vs SHE increasing over a period of 5 to 7 minutes to 825 mV vs SHE at pH 11.

Example 14; Continuous production of a multi-component biocidal complex. An example of generating multi-component biocidal complex solution continuously includes the following steps (e.g., FIG. 7): Potable water passes through a 25 micron particle filter, through a water softening media filter and fed into a pipe at a rate of 1.0 L/min. A 15% wt/vol solution of hydrogen peroxide is fed into the water stream at a rate of 0.33 L/min through a first tee fitting in the pipe and the mixture flows through a first in-line mixer. A 40% wt/vol sodium bisulfate solution is fed into the diluted hydrogen peroxide stream at a rate of 0.060 L/min through a second tee fitting in the pipe and the mixture flows through a second in-line mixer. A 0.1% wt/vol thymol solution is fed into the acidified hydrogen peroxide stream at a rate of 1.0 L/min through a third tee fitting in the pipe and the mixture flows through a third in-line mixer. The output solution composition then enters the buffer tank where it has a residence time of less than about 30 minutes.

Example 15: Gel Breaking ability for well squeeze to remove "polymer damage". The use of the sodium peracetate oxidant formulation was tested for the depolymerization and break down of guar gum. It was discovered that elevated concentrations, about 440 mg/L, of the sodium peracetate oxidant significantly reduce the viscosity of guar gum within about 2 hours as described below. Low concentrations, about 65 mg/L, of the sodium peracetate oxidant had no visible effect on viscosity, but did act as a preservative such that naturally occurring microbes and/or enzymes did not break down the guar gum for at least a week. The guar mixture was made by rapidly mixing 10 g/L food grade guar gum powder into a 10 g/L sodium chloride solution in distilled water. The blended mixture was heated to about 35-40° C. in a heated water bath for at least one hour to fully hydrate the guar. The mixture appeared translucent with fine, milky white suspended solids. The viscosity of the guar mixture was comparable to that of honey based on its flow behavior. Several 60 mL portions of the guar mixture were prepared for different treatments as summarized in Table 3. The first was a control sample to which no oxidant was added. The remaining samples had increasing amounts of sodium peracetate oxidant added to them. The oxidant was prepared as described in Example 4 and the pH was adjusted to about 9.1 with sodium bisulfate before use. The oxidant was rapidly mixed with the guar mixture resulting in a pale yellow color. The mixtures were placed in a water bath at about 35-40° C. and the yellow color gradually faded away over the next hour. After two hours the samples were cooled to room temperature.

TABLE 3

| Oxidant Conc. (mg/L) | Viscosity at 2 Hour Contact Time |
| --- | --- |
| 0 | same as initial |
| 65 | same as initial |
| 220 | slightly reduced |
| 440 | very reduced |

The control sample remained viscous for a day, but lost viscosity after sitting at room temperature overnight and microbial growth as a biofilm was visible after a week. The sample treated with about 65 mg/L oxidant retained its original viscosity and milky color for at least a week. The sample treated with about 220 mg/L oxidant had a small reduction in viscosity, but did not clear of its suspended material. The sample treated with about 440 mg/L oxidant had a rapid loss of viscosity over the first hour and was similar to a light vegetable oil in its flow behavior. The fine, suspended solids settled out leaving a clear, colorless solution. A second treatment of the last sample reduced the viscosity further by a small amount.

Example 16: "Frac on the Fly" Water Treatment. In this example the make-up water consists of a 10:1 volume ratio of fresh water to recycled produced water. The make-up water use rate to the frac chemical blenders is 70 barrels per minute (2940 gpm) and the water is drawn off of a bank of four, 550 barrel frac tanks, which are filled prior to the beginning of the frac operation and replenished as they are used. This arrangement provides about a 15 minute contact time for the water with the oxidant prior to use. For this water an oxidant demand was estimated to be nominally a 15 mg/L sodium peracetate oxidant dose concentration (12 mg/L measured as peracetic acid) such that the residual active oxidant concentration after 15 minutes of contact time was less than 6.5 mg/L (less than 5 mg/L measured as peracetic acid).

Water treatment is conducted by flowing the make-up water through a 10 inch diameter pipe outfitted with at least one injection point for adding oxidant and an in-line flash mixer downstream of the oxidant injection point(s) to blend the water with the oxidant. An ORP sensor is positioned in the water flow downstream of the flash mixer. A 5.4% sodium peracetate oxidant solution is generated by the method and apparatus described in Example 43 and delivered by a pump, integrated with an ORP control loop, to the oxidant injection point at a nominal rate of 4.0 L/min (1.05 gpm). The ORP after the flash mixer will read between about 630 and 680 mV vs standard hydrogen electrode. The ORP control loop will increase or decrease the oxidant feed rate around the nominal set point to maintain the ORP within the specified range after the flash mixer. The blended water is then distributed to the bank of frac tanks to be replenished. The ORP of the water being drawn from the bank of frac tanks will read less than about 500 mV.

Example 17: Oxidative clarification of suspended solids and metals. A produced water sample originating from the Denver-Julesburg basin formation in CO, USA contained suspended and dissolved solids, bacteria and up to about 2% salinity. The water sample was thoroughly mixed and 500 mL dispensed into 1 L beakers to conduct tests using a Phipps and Bird programmable jar tester. The jar tester was programmed for a rapid mix of high shear force at 295 rpm impeller speed for 1.25 minutes followed by a low shear impeller speed of 25 rpm for 20 minutes to promote floc formation and allow for pH and ORP monitoring prior to settling of solids. All tests were conducted at room temperature, 18-21° C. The 500 mL water samples were dosed with varying amounts of sodium peracetate oxidant solution during the rapid mix from an oxidant solution that was 2.2% wt/vol sodium peracetate (1.7% wt/vol measured as PAA). In some cases, during the rapid mix the jar samples were dosed with up to 5 mg/L of an anionic polymer dispersion as a floc aid.

Water parameters were measured by a variety of methods. The pH was measured using a high sodium electrode (Oakton model 35805-05) with three point calibration and automatic temperature correction. The ORP (oxidative-reductive potential) of solutions was measured using an Oakton model 35805-15 ORP probe calibrated to the standard hydrogen electrode (SHE) using Thermo/Orion ORP standard 967901. Sodium ion concentration was measured using a Cole-Parmer ion selective electrode, EW-27504-30, with two point calibration of a sodium standard solution of NaCl. Chloride ion concentration was measured using a Cole-Parmer ion selective electrode, SC-27504-08, with two point calibration of a chloride standard solution of NaCl. All measurements using HACH methods were measured using a HACH DR900 colorimeter. Calcium, magnesium and total hardness concentrations were measured using HACH method 8030. Sulfate concentration was measured using HACH method 10248. Aluminum concentration was measured using HACH method 8012. Iron concentration was measured using HACH method 10249 modified with a longer reaction time to minimize interferences from organic impurities. Total suspended solids (TSS) concentration was measured using HACH method 8006 modified for smaller volumes. Turbidity was measured using HACH method 8237. ATP (adenosine triphosphate) concentration was measured using the LuminUltra 2nd Generation metabolic ATP measurement technology with the LuminUltra Quench Gone-Organic Modified sampling method, a PhotonMaster Luminometer and LumiCalc software. Acid producing bacteria (ABP) and sulfate reducing bacteria (SRB) cell culture concentrations were measured with standard 1 mL serial dilutions using Intertek APB and SRB culture media, 1% salinity.

Water parameter test results for untreated water and three treatment tests are listed in Table 4. The untreated water was moderately acidic and appeared as a hazy orange-brown suspension of fine solids. Total iron concentration was 76 mg/L while dissolved iron in solution passed through a 0.45 micron filter was 7.8 mg/L. Jar tests on 500 mL quantities of this water were conducted as described above. The first treatment in Table 1 was a 29 mg/L dose of sodium peracetate oxidant (23 mg/L measured as PAA). The solution ORP increased rapidly to over 700 mV and the suspended and some dissolved solids rapidly coagulated and formed moderate-sized floc particles, which settled within 2-5 minutes after mixing ceased. A very pale, slightly hazy water fraction remained. The water fraction was analyzed as clarified without any filtration. Microbial test samples were prepared at 30 minutes contact time after the oxidant was added. Total iron was reduced from 76 to 16 mg/L and TSS was reduced from 264 to 194 mg/L. Aluminum concentration was reduced by about 40% and sodium concentration was reduced by about 30%. Disinfection was essentially complete as shown by the ATP concentration being reduced by 99.0% and no APB or SRB activity was observed for three months in cell culture media at room temperature.

The second treatment in Table 4 was a 52 mg/L dose of sodium peracetate oxidant (40 mg/L measured as PAA). The solution ORP increased rapidly to over 800 mV and the suspended and some dissolved solids rapidly coagulated and formed moderate-sized floc particles, which settled within 2-5 minutes after mixing ceased. A clear, colorless water fraction remained. The water fraction was analyzed as clarified without any filtration. Microbial test samples were prepared at 30 minutes contact time after the oxidant was added. Total iron was reduced from 76 to about 1 mg/L and TSS was reduced from 264 to 24 mg/L FAU (Formazin Attenuation Units) turbidity measured for this sample. Disinfection was essentially complete as shown by the ATP concentration being reduced by 99.3% and no APB or SRB activity was observed for three months in cell culture media at room temperature.

The third treatment in Table 4 was a 29 mg/L dose of sodium peracetate oxidant (23 mg/L measured as PAA) immediately followed by a 5 mg/L dose of anionic polymer dispersion Polymer B-40 supplied by Beckart Environmental, Inc. The solution ORP increased rapidly to over 700 mV and the suspended and some dissolved solids rapidly coagulated and formed large floc particles, which collected into a ball indicating that polymer was over dosed. Remaining suspended floc particles settled within 2 minutes after mixing ceased. A clear, colorless water fraction remained. The water fraction was analyzed as clarified without any filtration. Microbial test samples were prepared at 30 minutes contact time after the oxidant was added. Total iron was reduced from 76 to about 1.7 mg/L and TSS was reduced from 264 to 27 mg/L. Aluminum concentration was reduced by about 95% and sodium concentration was reduced by about 35%. Calcium concentration decreased by about 13%. Disinfection was essentially complete as shown by the ATP concentration being reduced by 99.6% and no APB or SRB activity was observed for three months in cell culture media at room temperature. The use of a polymer floc aid, Polymer B-40, resulted in lower concentrations of aluminum, iron and TSS than without polymer floc aid in the first treatment. An unexpected result was a lower ATP concentration (lower bacteria concentration) when polymer floc aid was used than without the polymer floc aid in the first treatment.

To effectively treat and clarify this water by oxidative clarification either a higher dose of sodium peracetate oxidant solution can be used or a small amount of floc aid combined with a lower dose of sodium peracetate oxidant solution can be used. The second and third treatments for this water type can readily meet a reuse specification for hydraulic fracturing makeup water if blended with freshwater or treated with a simple chemical softening step such as the use of soda ash or lime, depending on the scaling mineral composition present in the water. The second and third treatments for this water type are also suitable for pre-treatment before injection into a salt water disposal (SWD) well in a tight sandstone formation. For disposal in a SWD the addition of a scale inhibitor is recommended if no water softening is done.

TABLE 4

| Parameter | Untreated Water | 29 mg/L Sodium Peracetate Oxidant | 52 mg/L Sodium Peracetate Oxidant | 29 mg/L Sodium Peracetate Oxidant plus 5 mg/L floc aid |
|---|---|---|---|---|
| pH | 5.8 | 6.2 | 5.9 | 6.3 |
| ORP (mV vs SHE), maximum | 366 | 766 | 809 | 770 |
| Hardness (mg/L as $CaCO_3$) | 1250 | nd | 1220 | 1140 |

TABLE 4-continued

| Parameter | Untreated Water | 29 mg/L Sodium Peracetate Oxidant | 52 mg/L Sodium Peracetate Oxidant | 29 mg/L Sodium Peracetate Oxidant plus 5 mg/L floc aid |
|---|---|---|---|---|
| Calcium (mg/L as CaCO3) | 1080 | nd | 1020 | 940 |
| Magnesium (mg/L as CaCO3) | 170 | nd | 200 | 200 |
| Chloride (mg/L) | 12,700 | 12,500 | nd | 12,900 |
| Sodium (mg/L) | 7000 | 4760 | nd | 4560 |
| Sulfate (mg/L) | 0 (BDL) | nd | nd | nd |
| Aluminum (mg/L, total) | 2.1 | 1.2 | nd | 0.1 |
| Iron (mg/L, total) | 76 | 16 | 1 | 1.7 |
| TSS (mg/L) | 264 | 194 | (24 FAU, turbidity) | 27 |
| ATP (pg/mL), at 30 min CT | 135 | 1.4 | 0.9 | 0.6 |
| ATP reduction at 30 min CT | — | 99.0% | 99.3% | 99.6% |
| APB (cells/mL and log reduction) | >>10,000 | 5 log (no grow back | 5 log (no grow back | 5 log (no grow back |
| SRB (cells/mL and log reduction) | >>10,000 | 5 log (no grow back | 5 log (no grow back) | 5 log (no grow back |

CT = contact time; nd = not determined; BDL = below detection limit

Example 18: Synergy between Reactive Species Formulation and polymer. The produced water sample in Example 4 was used for demonstrating the synergistic advantage of the sodium peracetate oxidant solution on the performance of a polymer floc aid. A side by side oxidation and clarification test was conducted using equal molar dose concentrations of sodium peracetate oxidant and chlorine dioxide, 0.30 mmol/L (equal to 20 mg/L chlorine dioxide), followed by addition of 0.5 mg/L Polymer B-40 dispersion as the floc aid. Jar tests with 500 mL quantities of this water were conducted as described in Example 4.

The first treatment in Table 5 employed sodium peracetate oxidant solution, which was added during the rapid mix. The solution ORP increased rapidly to 766 mV vs SHE and decreased by 4 mV over the next 17 minutes. The suspended and precipitated solids rapidly coagulated and formed moderate-sized floc particles, which settled within 2-5 minutes after mixing ceased. A very pale, slightly hazy water fraction remained. The water fraction was analyzed as clarified without any filtration. Microbial test samples were prepared at 15 and 30 minutes contact time after the oxidant was added. After about 2 hours 0.5 mg/L of Polymer B-40 dispersion was added during a 45 second rapid mix, followed by a 10 minute slow mix, then 10 minutes of settling. A larger floc settled out rapidly. The final solution had a lesser amount of haziness than before polymer was added as shown by the TSS concentration.

The second treatment in Table 5 employed chlorine dioxide, which was added during the rapid mix. The solution ORP increased rapidly to 818 mV vs SHE and slowly decreased in the following 17 minutes to 785 mV vs SHE. There was no floc formation and minimal settling of the suspended solids after mixing ceased. A hazy orange-brown, turbid suspension of fine suspended solids remained and was darker in appearance than the untreated water, which was reflected in the increased TSS concentration due to oxidation and precipitation of dissolved materials. The water fraction was analyzed as clarified without any filtration. Microbial test samples were prepared at 15 and 30 minutes contact time after the oxidant was added. After about 2 hours 0.5 mg/L of Polymer B-40 dispersion was added during a 45 second rapid mix, followed by a 10 minute slow mix, then 10 minutes of settling. A fine floc slowly formed and settled out, but a moderately hazy water fraction remained as shown by the significant TSS concentration.

The sodium peracetate oxidant oxidized materials to forms that naturally flocculated and this minimized the amount of polymer floc aid needed to clarify the water. Chlorine dioxide, however, did not produce suspended solids in a form that could be flocculated very well resulting in lower polymer floc aid efficiency. The sodium peracetate oxidant reduced the live microbial population (inclusive of viable and non-viable cells) to slightly less than that of chlorine dioxide at both 15 and 30 minute contact times. The improved clarification and antimicrobial results were unexpected for the sodium peracetate oxidant solution.

TABLE 5

| Parameter | Untreated Water | 0.30 mmol/L Sodium Peracetate Oxidant | 0.30 mmol/L Chlorine Dioxide |
|---|---|---|---|
| pH | 5.8 | 6.2 | 5.6 |
| ORP (mV vs SHE), maximum | 366 | 766 | 818 |
| Iron (mg/L, total), oxidant only | 76 | 16 | 64 |
| Iron (mg/L, total), after polymer | — | 2.4 | 5.8 |
| TSS (mg/L), oxidant only | 264 | 194 | 756 |
| TSS (mg/L), after polymer | — | 32 | 97 |
| ATP (pg/mL), at 15 min CT | 135 | 4.1 | 10.3 |

TABLE 5-continued

| Parameter | Untreated Water | 0.30 mmol/L Sodium Peracetate Oxidant | 0.30 mmol/L Chlorine Dioxide |
|---|---|---|---|
| ATP (pg/mL), at 30 min CT | — | 1.4 | 7.7 |
| ATP reduction at 30 min CT | — | 99.0% | 94.3% |

CT = contact time

Example 19: Rate of disinfection in highly impaired water [Cl02 vs PM in early flowback]. An early flowback water was obtained from a source in the Denver-Julesburg basin formation in CO, USA. This water appeared black but had minimal free oil phase. The flowback contained a moderately high bacteria population and contained significant amounts of polysaccharide gel, scale inhibitor(s) and iron stabilizer(s) as evidenced by its ability to dissolve significant amounts of additional iron and calcium carbonate. The untreated flowback water had an ATP concentration of 1110 pg/mL, a pH of 6.97 and an ORP of 77 mV vs SHE. The oxidant demand of this water was high, requiring greater oxidant doses for microbial control.

A side by side comparison of antimicrobial rate and efficacy was conducted on this early flowback water comparing equal molar dose concentrations of sodium peracetate oxidant solution and chlorine dioxide at 1.7 mmol/L (equivalent to 115 mg/L chlorine dioxide). Jar tests with 900 mL quantities of this water were conducted as described in Example 4. Oxidant solutions and then 1 mg/L of Polymer B-40 dispersion were dosed during the rapid mix. ATP concentration, pH and ORP were measured over time.

The pH and ORP responses of the jar tests are listed in Table 6. When 1.7 mmol/L of each oxidant was dosed into the flowback water the ORP initially spiked and then decreased over time as the oxidant was consumed. The pH decreased more in response to addition of chlorine dioxide.

TABLE 6

| | 1.7 mmol/L Sodium Peracetate Oxidant | | 1.7 mmol/L Chlorine Dioxide | |
|---|---|---|---|---|
| Contact Time (minutes) | pH | ORP (mV vs SHE | pH | ORP (mV vs SHE) |
| 0 | 6.97 | 77 | 6.97 | 77 |
| 3 | 6.83 | 701 | 6.33 | 646 |
| 13 | 6.87 | 581 | 6.32 | 580 |
| 35 | 6.88 | 446 | 6.32 | 496 |
| 90 | 6.89 | 420 | 6.36 | 456 |

Figure 13:
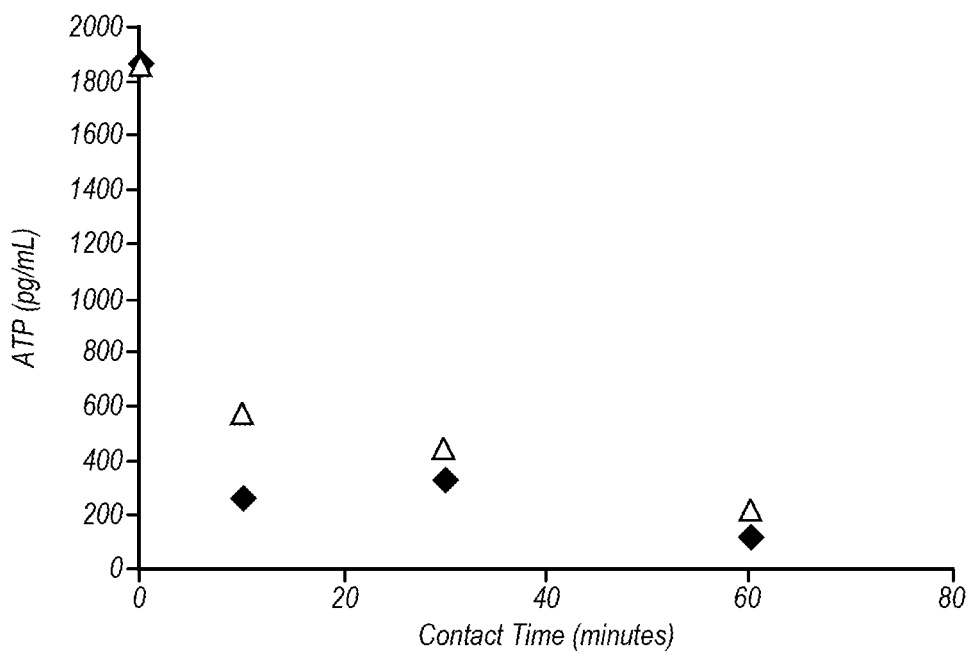
FIG. 13 depicts a graphical representation of ATP concentrations over time for a side by side comparison of antimicrobial rate and efficacy was conducted on this early flowback water comparing equal molar dose concentrations of sodium peracetate oxidant solution and chlorine dioxide of a water sample collected from a source in the Denver-Julesburg basin formation in CO, USA. Diamonds represent sodium peracetate oxidant treated solution. Triangles represent chlorine dioxide treated solution; both 1.7 mmol/L initial dose concentration.

The ATP concentrations for both jar tests were measured at 10, 30 and 60 minutes contact time and these results are shown in FIG. 13.
The sodium peracetate oxidant treated flowback water had a slightly greater rate of reduction of ATP concentration than chlorine dioxide.

Example 20: Multi-stage treatment; oil separation, water treatment [Express water]. A water sample originating from the Eagle Ford formation in South Texas, USA contained 35 to 40% by volume oily fraction. The water sample was thoroughly mixed and 2.0 L dispensed into 3.7 L cylindrical glass vessels with an inner diameter of 140 mm to conduct large volume jar tests using an overhead mixer. All tests were conducted at room temperature, 23-25° C. The oil-water and water samples were dosed with a sodium peracetate oxidant solution during a rapid mix from an oxidant solution that was 2.1% wt/vol sodium peracetate (1.6% wt/vol measured as PAA). The rate of oil-water separation, separation of emulsified water and impurities and the subsequent treatment of the water layer were evaluated. The untreated water exhibited two layers, a grey-brown, turbid water layer and a black-brown oil layer on top of the water. The oil to water ratio was approximately 1:4 by volume when allowed to sit idle for 30 minutes. The oil to water ratios and heights of three jar samples were adjusted to be equal before tests were conducted.

Control Sample: The oil-water mixture was rapid-mixed for 2 minutes and the homogenized mixture was allowed to stand idle and separate under the force of gravity for 20 minutes. The rate of oil-water separation was monitored by measuring the height of the visible oil-water interface from the base of the water fraction over time. The separation of emulsified water and impurities from the oil fraction was also monitored as the formation of a third layer between the oil and water fractions. Separation rates and volumes are provided in Table 7. After 20 minutes of separation the water fraction was carefully removed by siphon for measurement of water parameters as described in Example 4 including pH, ORP, iron, hardness and microbial concentrations with results provided in Table 7.

Enhanced Oil Separation: The oil-water mixture was rapid-mixed for 2 minutes and the sodium peracetate oxidant solution was added at 1.5 minutes at a dose concentration of 39 mg/L sodium peracetate oxidant (30 mg/L measured as PAA). The treated, homogenized mixture was allowed to stand idle and separate under the force of gravity for 20 minutes. The rate of oil-water separation was monitored by measuring the height of the visible oil-water interface from the base of the water fraction over time. The separation of emulsified water and impurities from the oil fraction was also monitored as the formation of a third layer between the oil and water fractions. These heights and volumes are provided in Table 7. After 20 minutes of separation the water fraction was carefully removed by siphon for total petrochemical hydrocarbon (TPH) analysis and total organic carbon analysis (TOC) measurements conducted by Accutest Laboratories, Wheat Ridge, Colo. Other water parameters were measured including pH, ORP and microbial concentrations with results provided in Table 7. Generally, the bulk oil-water separation occurred about 5% more rapidly with oxidant treatment than without. A third, distinct layer of emulsified brown, turbid liquid containing black particles separated at the base of the oil layer within 3-4 minutes after stirring was stopped. The volume of this layer was about 30% less than that of the similar looking layer in the untreated Control sample, which became visible after 45 minutes of settling. This was a repeatable result and suggests that the oxidant-treated oil-water mixture provides significantly more rapid separation of impurities from the oil fraction and potentially a higher grade of oil for recovery. The rates of oil separation and impurity separation were enhanced using a modest dose of sodium peracetate oxidant.

Treatment of water fraction after oil separation: A 2.0 L volume of water separated from oxidant-enhanced oil separation tests was treated with a multi-component treatment process based on synergies afforded by the sodium peracetate oxidant solution. The treatment process was unexpectedly rapid. The water was rapid mixed while 0.58 g of ferric chloride (10 mg/L as iron) was added to provide a reactive iron coagulant. Next, a dose concentration of 168 mg/L sodium peracetate oxidant (130 mg/L measured as PAA) was added (the mixture turned slightly more orange in color and more turbid with floc formation), followed by the addition of 0.8 g of soda ash. The pH was 5.9 and the ORP was 276 mV vs SHE. The mixing rate was slowed and the pH was raised to 10.5 by addition of 4 M sodium hydroxide solution during which the moderately strong smell of ammonia was released. The mixture turned darker grey-orange with flocculated material and the floc developed into larger particles over the next 20 minutes of slow mixing. This floc could settle at a modest rate leaving a clear, yellow water fraction. A 2 mg/L dose concentration of Polymer B-40 dispersion was added while mixing at moderately rapid rate for about 1 minute. Then the mixture was slow mixed for 2 minutes and a larger, faster settling floc rapidly developed. The mixture was allowed to settle for about 30 minutes and the clear, yellow water fraction was filtered through a 25 micron bag filter. The pH was then adjusted to pH 7.3 with concentrated hydrochloric acid. The finished water was analyzed for a select set of water parameters, bacteria count and total petroleum hydrocarbons (TPH) as reported in Table 7.

TABLE 7

| Parameter | Untreated Water | Enhanced Oil Separation | Treated Water |
|---|---|---|---|
| pH | 6.57 | 6.20 | 7.30 |
| ORP (mV vs SHE) | 164 | 184 | 181 |
| Alkalinity (mg/L as CaCO3) | 1950 | — | — |
| Calcium (mg/L as CaCO3) | 5700 | — | 5100 |
| Magnesium (mg/L as CaCO3) | 610 | — | 240 |
| Iron, Total (mg/L) | 280 | — | 0.0 |
| TSS (mg/L) | >750 | >750 | 2 |
| ATP (pg/mL) | 7430 | 7080 | 2.6 |
| APB (cells/mL) | 100,000 | 100,000 | 10-100 |
| SRB (cells/mL) | >10,000,000 | >10,000,000 | 10-100 |
| TPH (C6-C12), mg/L | 33.2 | — | 8.48 |
| TPH (>C12-C28), mg/L | 59.8 | — | 0.85 |
| TPH (>C28-C35), mg/L | 9.59 | — | non-detect |

Analysis of the Treated Water showed removal of iron and total suspended solids (TSS). Acid producing bacteria (APB) were reduced by 3-4 log and sulfate reducing bacteria (SRB) were reduced by more than 5 log. Hardness as calcium and magnesium was reduced by a modest amount indicating that a scale inhibitor was interfering with softening. The treated water was clear, but yellow in color.

The yellow color was removed from the water by addition of powdered activated carbon (PAC). A 1.0 g/L concentration of PAC was rapid mixed into the above Treated Water reported in Table 7. After about 20 minutes of contact time a 2 mg/L dose concentration of polymer B40 dispersion was added. No flocculation of the carbon was observed in the absence of oxidant. The fine, black carbon suspension required several hours to settle from the water. The yellow color was removed and the hardness was decreased to about 4000 mg/L calcium as $CaCO_3$ and 200 mg/L Mg as $CaCO_3$ indicating that scale inhibitor was at least partially removed by the activated carbon.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for continuous supply of superoxide-containing peracetate oxidant solution with activity to generate reactive oxygen species for oxidative treatment, the method comprising:
    production processing in a liquid stream, comprising:
        providing a feed of the liquid stream comprising an alkaline hydrogen peroxide and superoxide solution composition;
        after the providing, adding an acetyl donor to the liquid stream to react in the liquid stream to form a peracetate-superoxide oxidant solution in the liquid stream;
        introducing the liquid stream with the peracetate-superoxide oxidant solution into a product buffer tank to collect the peracetate-superoxide oxidant solution in the product buffer tank; and
    dispensing the peracetate-superoxide oxidant solution from the product buffer tank for use as an oxidant; and
    wherein as introduced into the product buffer tank the peracetate-superoxide oxidant solution has a pH in a range of from about pH 10.5 to about pH 13.

2. The method of claim 1, comprising evolving oxygen gas from the peracetate-superoxide oxidant solution in the product tank and venting evolved oxygen gas through a gas vent of the product buffer tank.

3. The method of claim 1, wherein the production processing comprises, prior to adding the acetyl donor, adding a hydrogen peroxide solution to the liquid stream to adjust a peroxide to superoxide ratio in the liquid stream.

4. The method of claim 3, wherein the production processing comprises, after the adding the hydrogen peroxide solution and prior to the adding the acetyl donor; adding an acid solution to the liquid stream to reduce a pH of the liquid stream to pH 13 or less.

5. The method of claim 4, wherein the production processing comprises:
    first mixing the liquid stream with a first mixer after the adding the hydrogen peroxide solution and prior to the adding the acid solution; and
    second mixing the liquid stream with a second mixer after the adding the acid solution and prior to the adding the acetyl donor.

6. The method of claim 5, wherein each said mixer is an in-line mixer.

7. The method of claim 1, comprising metering of each of the feed of the liquid stream and a reagent stream comprising the acetyl donor added to the liquid stream through separate metering pumps.

8. The method of claim 7, wherein the product buffer tank comprises a dual level switch having a feedback loop controlling the operation of the metering pumps based on monitored maximum and minimum liquid levels within the product buffer tank.

9. The method of claim 8, comprising during the production processing, simultaneously operating the metering pumps at fixed rates.

10. The method of claim 9, comprising periodically discontinuing the production processing by switching off operation of all of the metering pumps.

11. The method of claim 10, wherein the dispensing comprises metering dispensation of the peracetate-superoxide oxidant solution from the product buffer tank through at least one product metering pump.

12. The method of claim 11, wherein the dispensing comprises dispensing the peracetate-superoxide oxidant solution from the product buffer tank at a rate that is less than or equal to a rate of introduction of the peracetate-superoxide oxidant solution during the production processing.

13. The method of claim 12, wherein a residence time of the peracetate-superoxide oxidant solution in the product buffer tank is 10 minutes or less.

14. The method of claim 13, comprising adding the peracetate-superoxide oxidant solution dispensed from the product buffer tank during the dispensing to an impaired water for oxidative treatment of the impaired water.

15. The method of claim 14, comprising generating singlet oxygen in the impaired water as a consequence of adding the peracetate-superoxide oxidant solution to the impaired water.

16. The method of claim 14, comprising separating contaminants from the impaired water following the oxidative treatment of the impaired water.

17. The method of claim 1, wherein the feed of the liquid stream comprises a molar ratio of sodium superoxide to sodium peroxide of at least 1.56:1.

18. The method of claim 17, wherein the feed of the liquid stream comprises sodium superoxide at a concentration of at least 0.34% wt/vol.

19. The method of claim 17, wherein the peracetate-superoxide oxidant solution as dispensed from the product buffer tank has a molar ratio of superoxide to peracetate of at least 1.5:1.

20. The method of claim 19, wherein the peracetate-superoxide oxidant solution as dispensed from the product buffer tank comprises 0.5% to 1.5% sodium peracetate and sodium superoxide.

\* \* \* \* \*